June 4, 1957  J. A. CORTELLI ET AL  2,794,523
CONTROL DEVICES AND SYSTEMS
Filed April 4, 1952  10 Sheets-Sheet 1
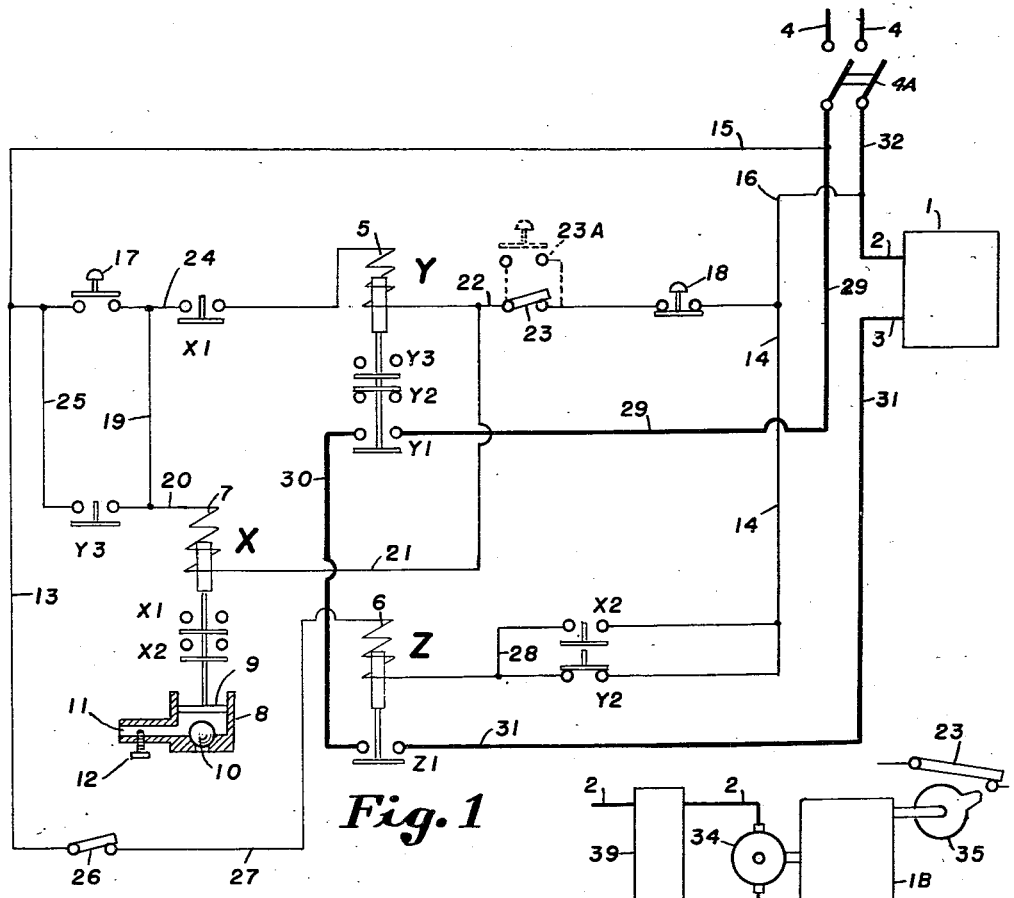
Fig. 1
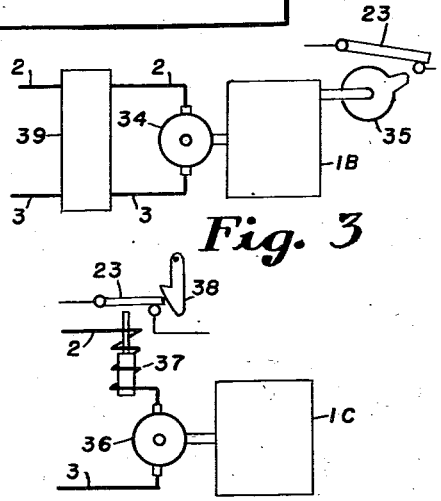
Fig. 2
Fig. 3
Fig. 4
INVENTORS
John A. Cortelli
and
BY Robert H. Hoge
Harry P. Canfield
Attorney INVENTORS
John A. Cortelli
and
BY Robert H. Hoge

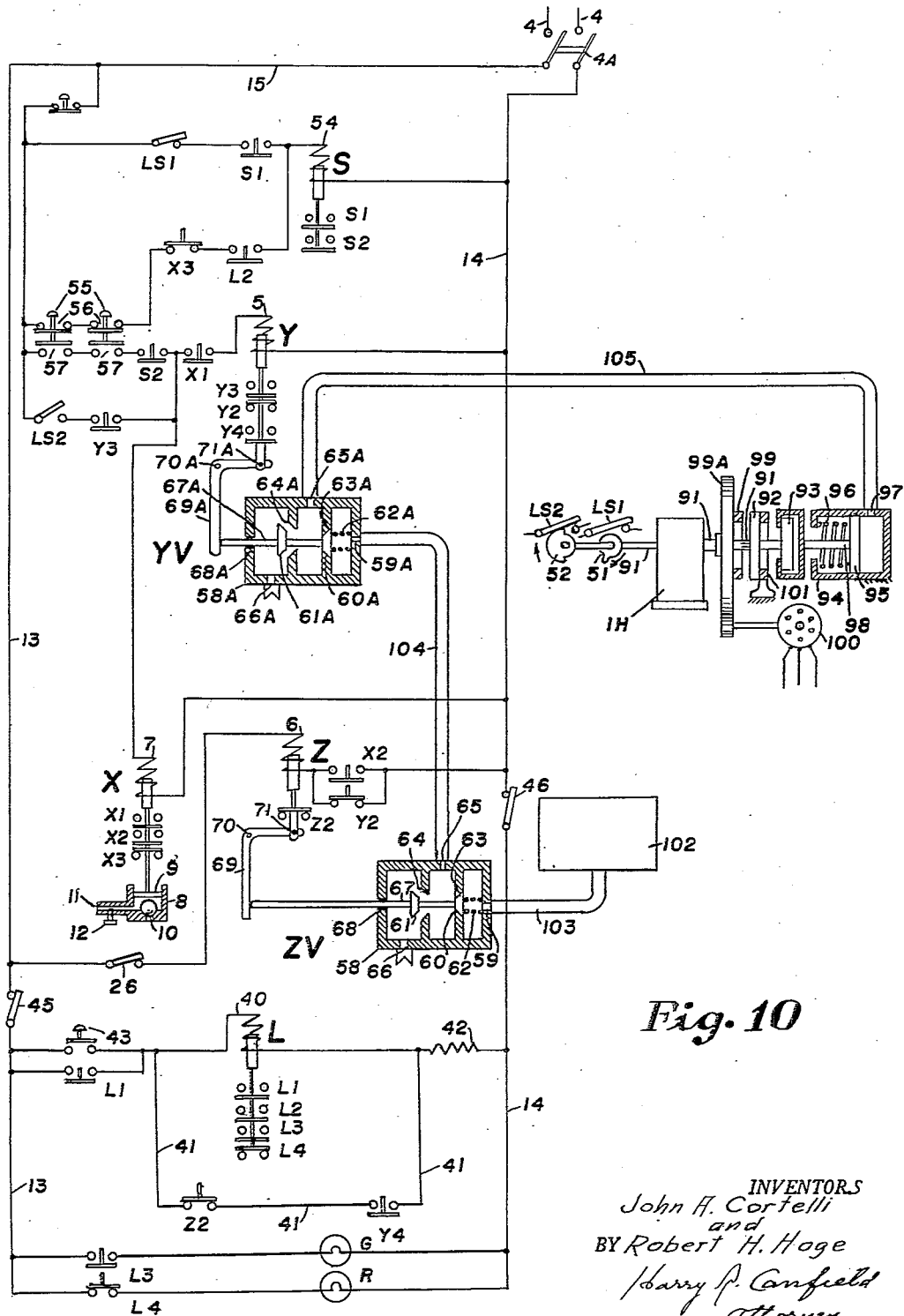

June 4, 1957  J. A. CORTELLI ET AL  2,794,523
CONTROL DEVICES AND SYSTEMS
Filed April 4, 1952  10 Sheets-Sheet 9

INVENTORS
John A. Cortelli
and
BY Robert H. Hoge

Harry P. Canfield
Attorney

United States Patent Office 2,794,523
Patented June 4, 1957

2,794,523
CONTROL DEVICES AND SYSTEMS

John A. Cortelli, Cleveland Heights, and Robert H. Hoge, Gates Mills, Ohio, assignors to The Clark Controller Company, Cleveland, Ohio, a corporation of Ohio Application April 4, 1952, Serial No. 280,684

10 Claims. (Cl. 192—12)

This invention relates to methods and means for automatically detecting, or detecting and indicating, that devices which control operation of an apparatus, are operating normally or abnormally; and for automatically correcting for abnormal operation.

In the various arts, there are various kinds of power operated apparatus, including machines, and processes etc. that have associated therewith, control devices of various kinds, which, by their operations, cause the operations of the apparatus to occur, or control the operations while going on; or apply the power to the apparatus or interrupt the power.

The said control devices are associated or connected with the apparatus and in some cases with each other, by so called control systems.

The control devices are of various kinds and the control systems correspondingly of various kinds.

For example, in some cases the control systems are of the electric type and the devices are electrically or electromagnetically operated, and the connections are made by electric conductors.

In other cases, the control devices are of the fluid pressure type, hydraulic or pneumatic, and may be in the form of valves and the control system connections are made by fluid pressure conduits; and in this latter class the control devices may control fluid pressure but be actuated electrically, and the control system then includes both electric and fluid pressure connections.

The apparatus controlled by the control devices is also of various kinds.

In some cases, for example, the function of the control devices is to apply power continuously to an apparatus for a period of time, and then interrupt it; as for example in the case of an electrically energized furnace.

In other cases, the power is applied and interrupted, repeatedly, time after time, as for example in the case of a welding apparatus.

In other cases, the power is applied and interrupted at the will of an operator as for example in an electric or hydraulic elevator.

In other cases, the apparatus is a machine that operates cyclically, starting from rest and performing a sequence of operations and coming to rest again, cycle after cycle as in the case of a cyclically operating press.

In many instances it is of vital importance that the said control devices function normally; because abnormal functioning or failure to function may cause abnormal operation of the apparatus, resulting in serious damage and loss.

In some cases the apparatus works or handles material, and the damage or loss may be damage to the machine or loss of or damage to the material; and in other cases persons may be near the apparatus such as workmen who attend and serve the apparatus, or work in its vicinity, and in such cases, personal injury may result from abnormal operation of the apparatus due to abnormal functioning of the said devices.

As one illustrative instance in which such loss or injury may occur is the case of a crane that hoists and transports a ladle of molten metal and in which motor power is used to effect movements of the ladle in pouring the molten metal into molds, and control devices control the motor. The control devices must function normally, infallibly, because if their functioning becomes abnormal, the ladle may continue to pour after the mold is filled and overflow the mold, with attendant loss of metal, and also injury to workmen who are in the vicinity.

Another illustrative example is an electric or hydraulic passenger elevator which to be safe must be started and stopped infallibly by normal operation of control devices.

Another illustrative example is an electric furnace, the heating current to which must be infallibly cut off at a predetermined temperature.

Another illustrative example is a reciprocatory press operating cyclically as above referred to, wherein a clutch and brake apparatus must operate infallibly subject to normal operation of a control device. If the control device functions abnormally, or fails to function, the brake may not stop the press at the end of one cycle and another cycle may be initiated, and workmen tending and serving the press and expecting the press to stop may move into dangerous positions and be injured by the unexpected continued operation of the press.

The above mentioned various kinds of apparatus, and control devices, and control systems, are only some of those to which the present invention relates, and are mentioned as indicative of the scope of the invention.

Safety to workmen who tend and serve apparatus or machines, and who might be injured by abnormal machine operation, is of primary importance in many arts, including those referred to.

Injury to them usually results from their lack of acuity, or their carelessness, in not perceiving that the machine is operating abnormally, and in carelessly getting parts of their bodies in positions of danger at the machine.

But it has long been recognized that workmen who attend and serve machines cannot be expected to exercise the necessary care for their own protection and safety; and much invention and engineering development has been devoted to the problem of devising control systems for the said devices that will insure against accidental injury to the workmen.

To this end, control systems for such control devices have been devised in which the control devices are actuable by the workmen themselves, but cannot be actuated or maintained actuated by them during those operations of the machine that conceivably could cause injury to them, unless the workmen are standing clear of and at a safe distance from the machine.

Thus the problem of safety for the workmen has been successfully solved, so far as the system actuating the control devices to perform their controlling functions is concerned, but such systems do not protect careless workmen if a control device itself fails or begins to function abnormally and causes the machine to operate abnormally.

For example, in the illustrative example of a cyclically operating machine under control of such a control system, and which would normally be automatically stopped by a control device at the end of its cycle, making it then safe for the workmen to stand close to the machine to serve it, an abnormal functioning or a failure of the control device that is being relied upon to stop the machine, may cause it to unpredictably and unexpectedly continue to run and perform a succeeding cycle independently of actuation by the workmen, and at a time when they have carelessly moved into positions of danger.

Thus the development of the art has reduced the problem of complete safety to that of insuring safe condition of the control devices themselves.

Industrial plants in which machinery of the class hereinabove referred to is installed, have maintenance departments whose employees have as part of their responsibility, the frequent inspection, adjustment, etc. of all machinery to keep it in good working condition, primarily so that continuous production will not be interrupted.

However, it has been found that due to carelessness or lack of instructions and discipline of the maintenance employees, or due to the fact that a control device sometimes cannot be completely inspected when assembled in an installation, control devices are sometimes allowed to deteriorate or get out of adjustment, after continued use, and as a consequence, they function abnormally or fail; and therefore inspection and adjustment even by maintenance employees employed for the purpose, cannot be relied upon to insure the safe condition and normal operation of the control devices referred to.

A problem therefore arises, which the present applicants conceive of as the problem of providing a method and means for causing the aforesaid apparatus control devices themselves to be, so to speak, "self inspecting," and to indicate or warn by well understood danger signals when they are not in condition to function normally and are therefore unsafe, and particularly when they have failed to operate; and further to automatically correct for their own abnormal operation or failure which, unless corrected, might cause an abnormal operation of the apparatus that could injure carelessly exposed workmen.

The primary object of the invention is to solve this problem.

According to the present invention, the problem has been solved by providing a primary control device to perform an apparatus controlling function, and also a secondary control device, which may, for convenience or economy, be like the primary device.

The primary device operates continuously, or repeatedly, to perform the machine controlling function. The secondary device remains idle and therefore is not subject to deterioration by wear, or change of adjustment, etc. but is held in reserve in safe working condition.

Upon abnormal functioning or failure of the primary device due to deterioration or change of adjustment after continued use, or to any other cause, the secondary device automatically comes into action and is automatically substituted for the primary device and takes over and performs the function of the primary device for it.

A local control system is provided for the primary and secondary devices; and when the apparatus being controlled is one that could injure workmen by abnormal operation, as aforesaid, the system comprises automatic signalling means which will indicate when the primary device is functioning normally, and when it can be safely relied upon; and which will indicate when it functions abnormally or fails; and which will indicate when the secondary device is in condition to be safely relied upon; and when it has taken over the functions of the primary device.

The signal means may be of any kind but preferably comprises green and red lamps because green and red commonly are used to indicate safety and danger, and the workmen will be informed thereby instantaneously, as to the safe or dangerous functioning of the machine, without any interposed delay for mentally translating the meaning of the signals.

Besides the main object hereinbefore stated other objects are to provide embodiments of the invention by which it may be applied to various arts; in some of which as will become apparent abnormal functioning of the control devices might cause damage or loss with respect to material or to the apparatus only, and the protection of workmen or others near the apparatus is not involved.

The invention is fully disclosed in the following description taken in connection with the accompanying drawing in which:

Figs. 1 to 7 are views illustrating diagrammatically, all-electric embodiments of the invention; and of which, Fig. 1 is a view illustrating diagrammatically an embodiment in which electric current is supplied to a generalized machine, and an electric control system is actuated to infallibly interrupt the current;

Figs. 2, 3 and 4 are fragmentary views showing illustrative examples of particular kinds of machines that may be used in the embodiment of Fig. 1;

Fig. 5 is a view like Fig. 1 but with a signal lamp control added;

Fig. 6 is a view like Fig. 1, with the signal lamp control of Fig. 6 and with a modification of the control system to cause the current to the machine to be repeatedly made and interrupted;

Fig. 7 is a view like Fig. 5 but showing a machine of the cyclically operating class, and with safety features of control added;

Figure 7:
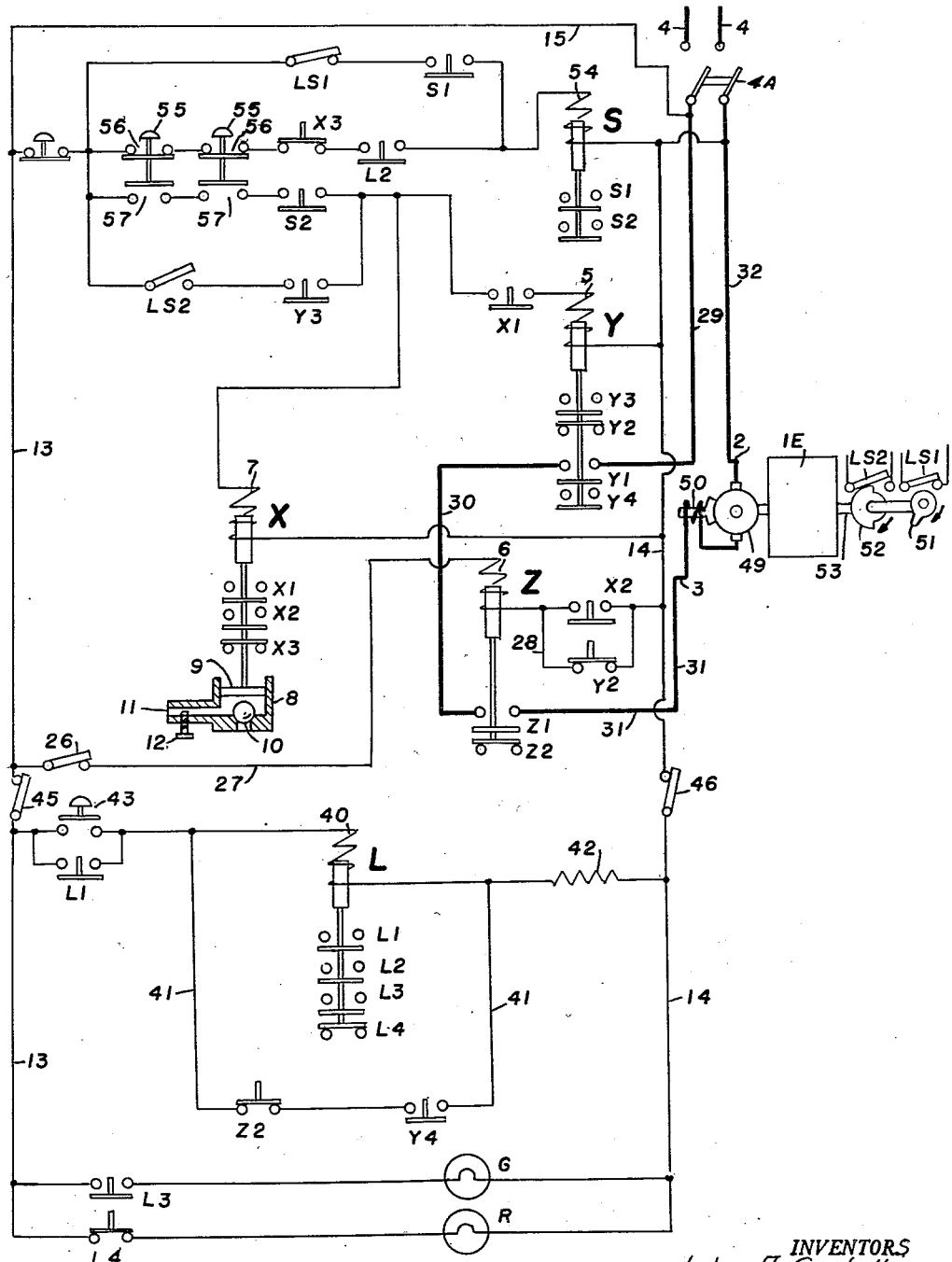
Figure 8:
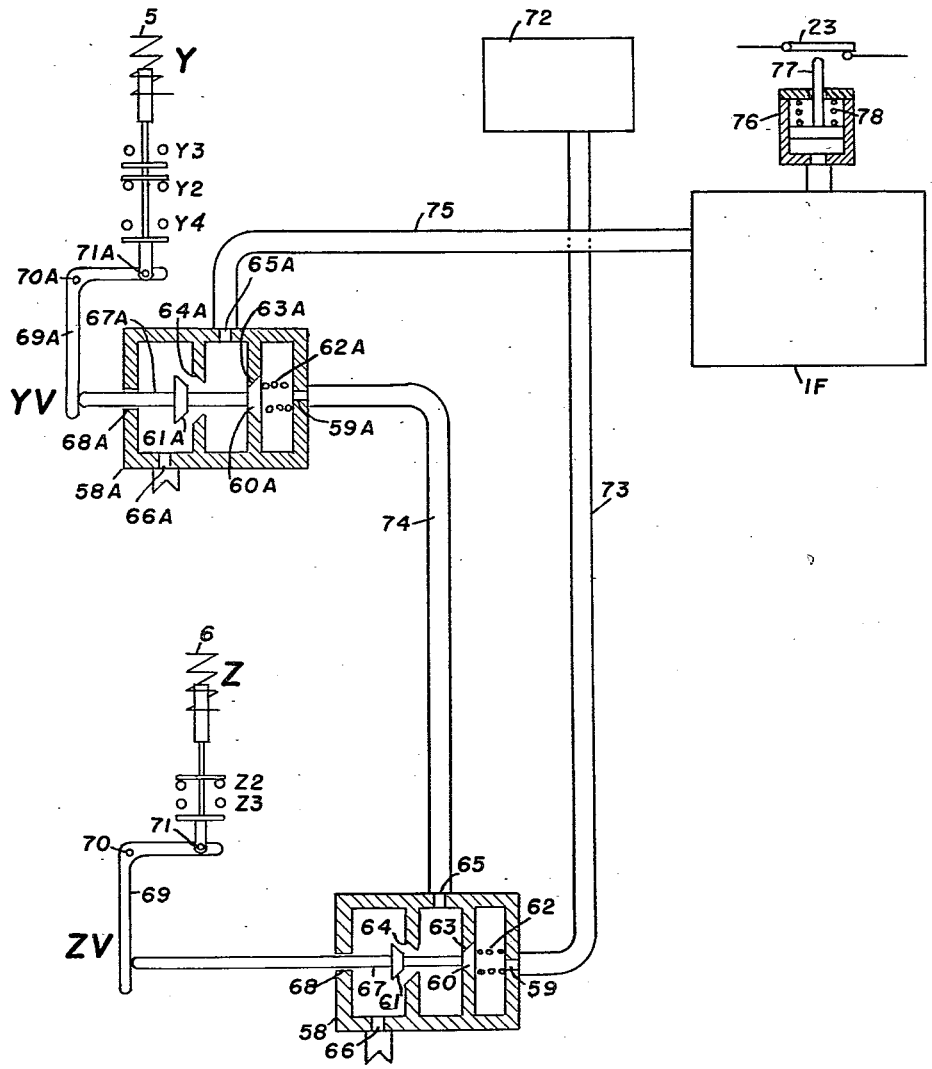
Figure 9:
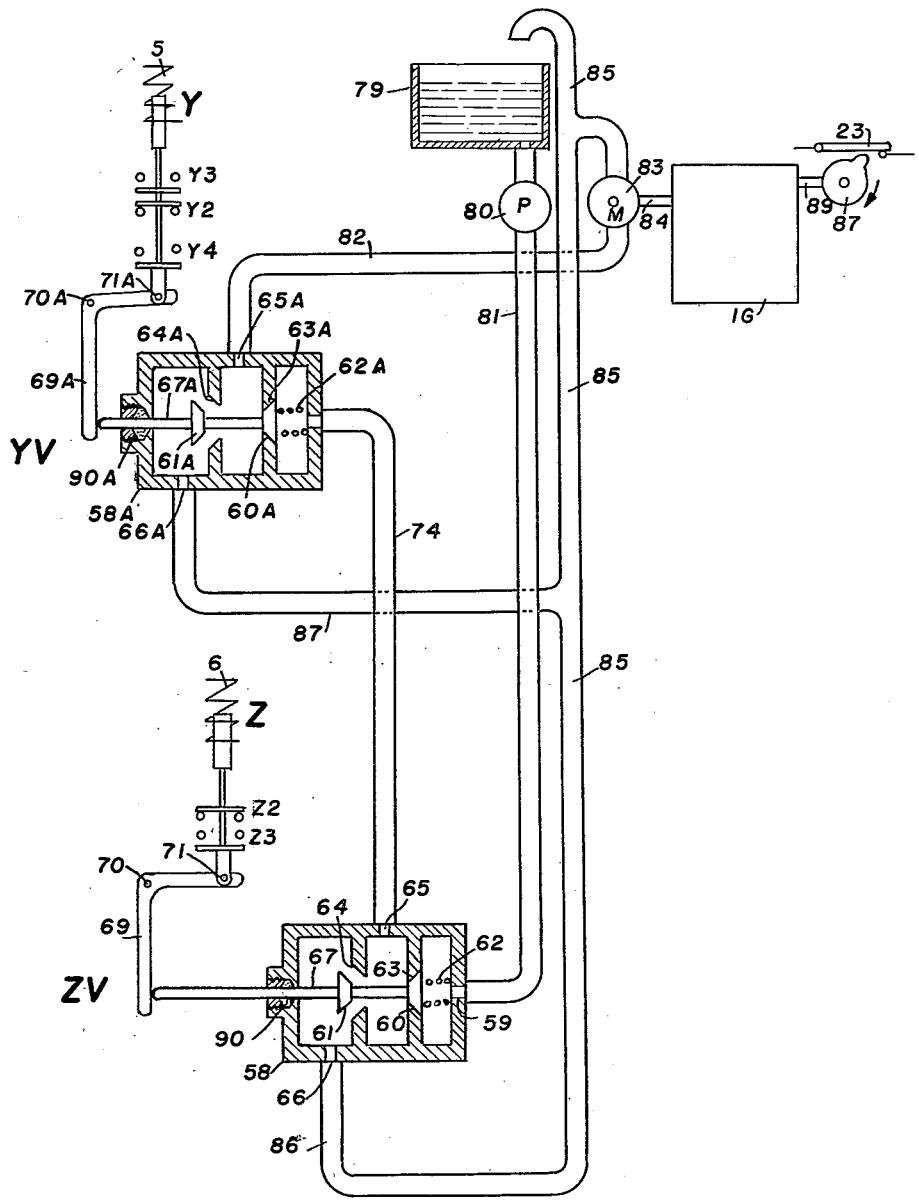
Figure 11A:
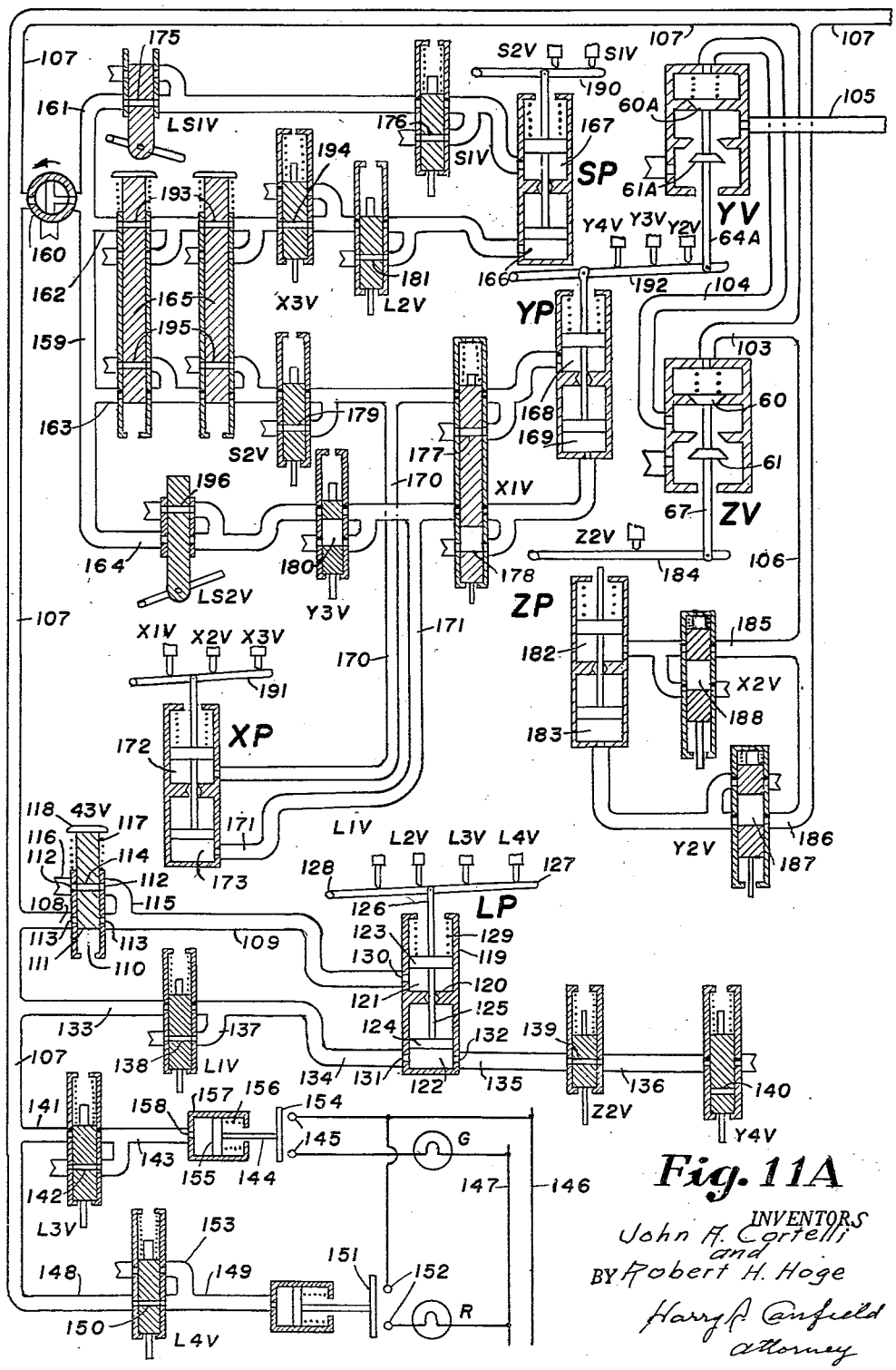
Figure 11B:
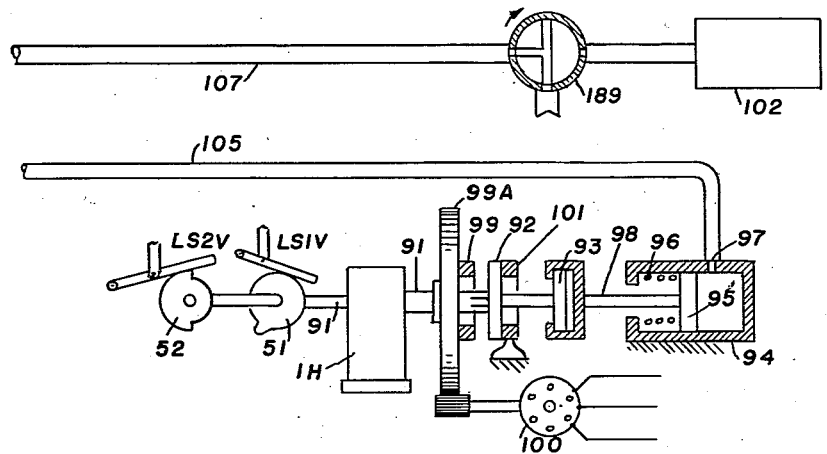
Figure 12:
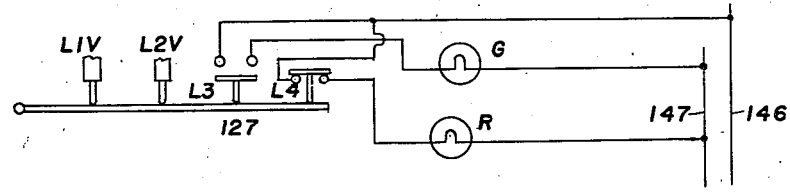
Figure 14:
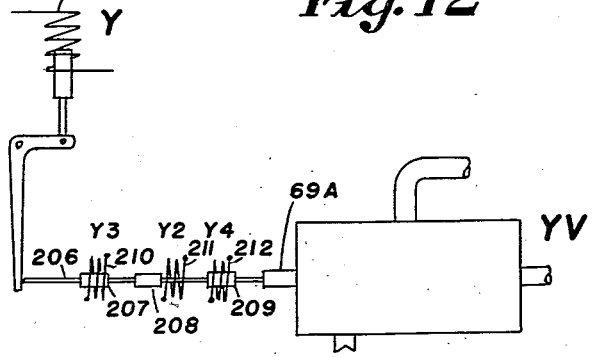
Figure 13:
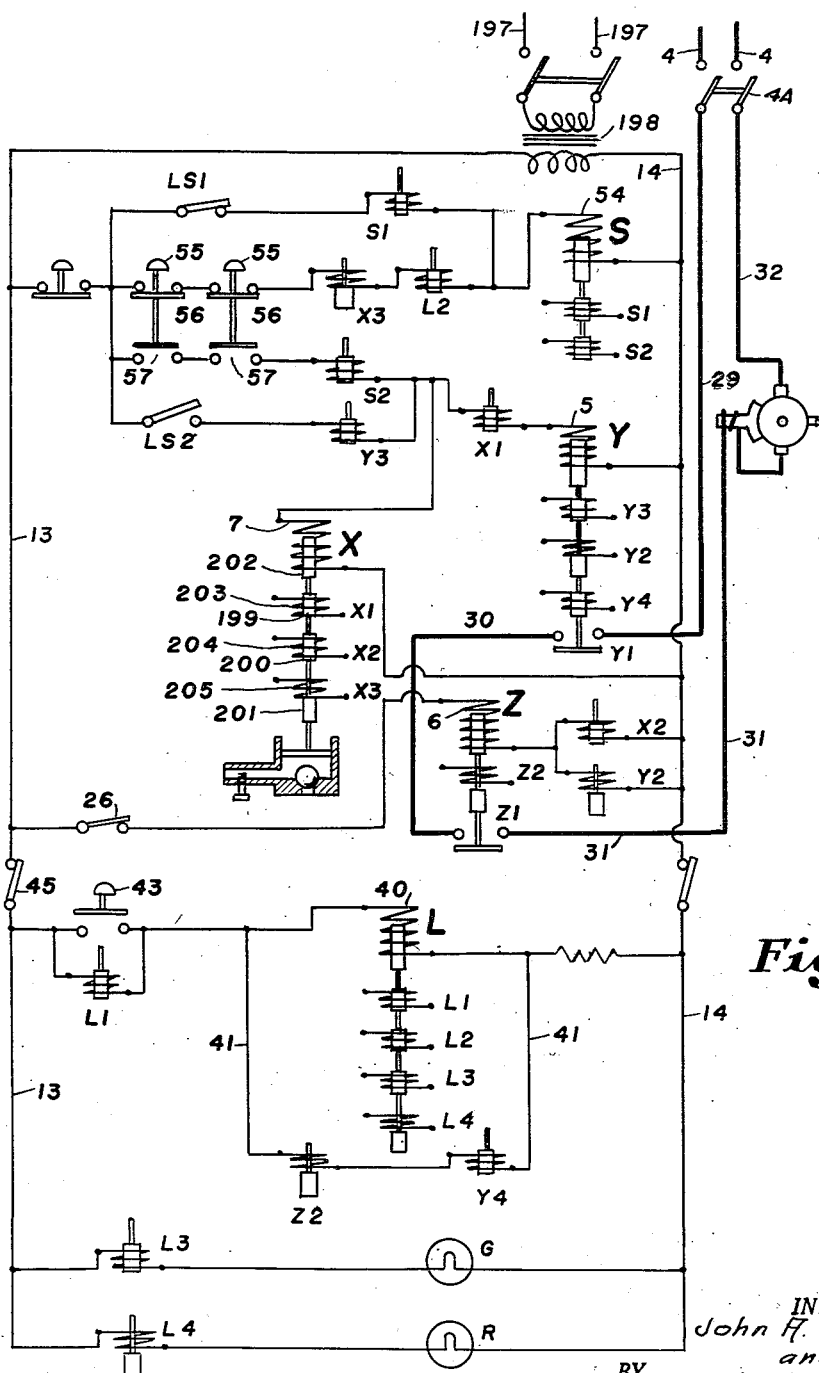

Figs. 8, 9 and 10 are views illustrating diagrammatically, part-electric and part-fluid-pressure embodiments of the invention; and of which, Fig. 8 is a view illustrating an embodiment in which the fluid pressure is air under pressure, supplied to a machine and in operation is infallibly cut off therefrom, by valve devices, and the valve devices are operated and controlled by an electric system like those of Figs. 1 to 6, and shown fragmentarily in Fig. 8;

Fig. 9 is a view similar to Fig. 8 but in which the fluid pressure is liquid under pressure;

Fig. 10 is a view, corresponding to the all-electric embodiment of Fig. 7, showing the electric control system of Fig. 7, but with fluid pressure valve devices controlled thereby as in Fig. 8;

Fig. 11A and Fig. 11B taken together constitute a view illustrating an all-fluid-pressure embodiment of the invention, corresponding to the part-electric part-fluid-pressure embodiment of Fig. 10, but in which fluid pressure valves, conduits, etc., take the place of contactors, conductors etc. of Fig. 10;

Fig. 12 is a fragmentary diagrammatic view illustrating a modification of a signal lamp control of Fig. 11A;

Fig. 13 is another all-electric embodiment of the invention, like that of Fig. 7, but with inductive coil-and-core control devices in place of make-and-break control contacts of Fig. 7;

Fig. 14 is a fragmentary view illustrating how the said coil-and-core inductive devices may be associated with valve devices such as are utilized in Figs. 8, 9 and 10.

Referring to the drawing, Fig. 1 illustrates a simple embodiment of the invention in which the aforesaid primary and secondary control devices are electromagnetic contactors, and in which the system connections are electric conductors; and the apparatus whose operation is to be controlled, and chosen for illustration purposes, is one to which electric current is supplied continuously; and the function of the primary control device is to interrupt the current in case of an emergency; or, as will be described with reference to Figs. 2, 3 and 4, to interrupt it upon the occurrence of some event at the apparatus.

At Y and Z are the primary and secondary control devices. The apparatus is shown at 1, supplied with current in line 2—3 connected to mains 4—4 by a main switch 4A to be referred to.

The device Y is relied upon to interrupt the current. The device Z normally remains inactive; but if the device Y fails to interrupt the current, the device Z is automatically brought into action and is substituted for the device Y, and performs its current interrupting function for it; as contemplated by the invention as hereinbefore explained.

The contactor Y has a winding 5, and normally open contacts Y1—Y3 and normally closed contacts Y2.

The contactor Z has a winding 6 and normally open contact Z1.

At X is a system contactor having a winding 7 and normally open contacts X1, X2, and is preferably of the type that operates instantly when its winding is energized, but restores with a slight delay when de-energized. Any suitable delaying timer may be provided for this purpose, and a generalized timer is indicated diagrammatically, comprising a cylinder 8 and a piston 9 therein which can move upwardly without delay by the opening of a valve 10 to admit air under the piston, and which will be delayed upon downward movement by closure of the valve and escape of air through a port 11, the delay being adjustable by a throttling screw 12, in a well known manner.

The control system has opposite control mains 13—14 supplied with potential from the source 4—4 by wires 15—16, and the system is illustrated as of the across-the-mains type for simplification, and to this end the said contacts of the contactors are reproduced elsewhere in the system.

Parts not thus far described will be described in the following description of operation.

To put the system into operation, a normally open manual start contactor 17 is momentarily closed, and current from main 13 flows therethrough and thence by wires 19—20 through winding 7 of contactor X and by wires 21—22 through a normally closed actuating contactor 23 and through a normally closed manual emergency contactor 18 to the main 14.

Contactor X immediately operates, closing contacts X1 and X2.

Upon closure of contacts X1, current through manual contactor 17, flows by wire 24 through now closed contacts X1, winding 5 of contactor Y, by wire 22 through contactors 23 and 18 to main 14, energizing contactor Y, and it operates and closes contacts Y1—Y3 and opens contacts Y2.

Upon closure of contacts Y3, normally open manual contactor 17 may be released and allowed to open, and the windings 7 and 5 will be maintained energized by a bridge across the contactor 17 comprising wires 25 and 19 and closed contacts Y3.

Contactors 23 and 18 being closed, current from main 13 flows through contactor 26 and a wire 27 and winding 6 of contactor Z and by wire 28 through now closed contacts X2 to main 14.

The contactors 23 and 26, will be referred to later.

Contactor Z operates, closing contacts Z1.

Apparatus current now flows from one main 4 by wire 29, closed contacts Y1, wire 30, closed contacts Z1, wires 31—3, to the apparatus, and therefrom by wires 2—32 to the other main 4.

When an emergency arises, contactor 18 is opened manually and the winding 5 of contactor Y is thereby de-energized, and it restores to the position shown in the drawing, and interrupts the apparatus current at the contacts Y1 as is intended in normal functioning of the device Y as the primary control device.

Opening of contactor 18 also de-energizes winding 7 of contactor X and it starts to restore, but with delay as described. After the delay it will open contacts X1 and X2.

Upon opening of contactor 18, the winding 6 of the contactor Z remains energized; at first through contacts X2 between wire 28 and main 14; and also through contacts Y2, between the winding 6 and main 14, when contacts Y2 close; and finally through closed contacts Y2 alone, when contacts X2 finally open after the said delay. Thus the contactor Z as the said secondary control device remains inactive for the purposes referred to.

Thus in normal functioning of the primary device Y, when contactor 18 opens, the apparatus current will be interrupted by the primary device Y.

If now the primary device Y should fail to restore and fail to interrupt the current to the apparatus, for example due to "sticking" of the contactor Y in the operated position, or due to an accidental ground connection that keeps its winding energized, or for any other reason, then, upon opening of the contactor 18, responsive to which the primary control device Y was relied upon to interrupt the current, the secondary control device Z is automatically substituted for it and performs its function of interrupting the current for it; as follows:

Opening of contactor 18, de-energizes winding 7 of contactor X as aforesaid and it restores. Assuming that the contactor Y abnormally remains operated, the winding 6 of contactor Z is energized through contacts X2 alone, contacts Y2 being held open; and as soon as contactor X is restored as aforesaid, contacts X2 open, de-energizing contactor Z and it restores, opening contacts Z1 and interrupting the current.

The purpose of the slight delay of contactor X in restoring, is to enable the contacts Y2 to close before contacts X2 open in normal operation, to keep contactor Z operated; and to transfer the control of contactor Z to contactor X upon failure of contactor Y to open.

The contactor 26 may be opened and closed from time to time at infrequent intervals to de-energize and again energize winding 6 of contactor Z; and also whenever the line switch 4A is opened and closed contactor Z will be restored and again operated; and this provides periodic testing or inspection of the secondary device or contactor Z, to insure that it is always in good working condition.

If preferred, the contactor 26 may be closed at the start, and contactor Z will then immediately operate, the winding 6 being energized through closed contacts Y2. When contactor X operates, it closes contacts X2 and winding 6 is energized therethrough when contacts Y2 open. By this alternative mode of operation the main current is initiated on the working contacts Y1 of contactor Y instead of on the contacts Z1 of the reserve contactor Z, and the contactor Z is saved from even the slight deterioration due to initiating the main current on its contacts.

The contactor 23 is to be utilized to perform the function of emergency contactor 18, to cause interruption of the apparatus current, in response to various conditions at, or operations of, the apparatus according to different arts; some of which are described below as illustrative examples.

In Fig. 2 the apparatus, here 1A, may be considered as an electric processing furnace heated by the main current from wires 2—3; and may have a regulating thermostat 33 which upon attainment of a desired temperature opens the contactor 23. If the temperature falls, the contactor 23 will close again to again cause the contactor Y to close to supply heating current.

As indicated in Fig. 3, the apparatus, here 1B, is driven by a motor 34 supplied with current by the wires 2—3; and the apparatus has a rotary driven cam device 35, which completes a revolution after a timed operation of the apparatus and opens the contactor 23, and stops the apparatus operating motor 34. In this case, to start the apparatus operation again, if the motor stopped with cam device 35 in position to hold the contactor 23 open, a normally open manual contactor 23A shown in dotted line in Fig. 1 and bridging the contactor 23 may be closed temporarily, until the cam device lets the contactor 23 close again.

The cam device 35 may also be a limit switch to prevent over travel of mechanism of the apparatus, and the motor 34 may have a reversing controller at 39 to start the apparatus back in the other direction.

As indicated in Fig. 4, the main current in lines 2—3 may be the current to drive the operating motor 36 of an apparatus, here 1C, and the contactor 23 may be opened upon the occurrence of a current overload, in a series overload winding 37, and latched open by a latch 38.

Other examples will occur to those skilled in the art.

Figure 5:
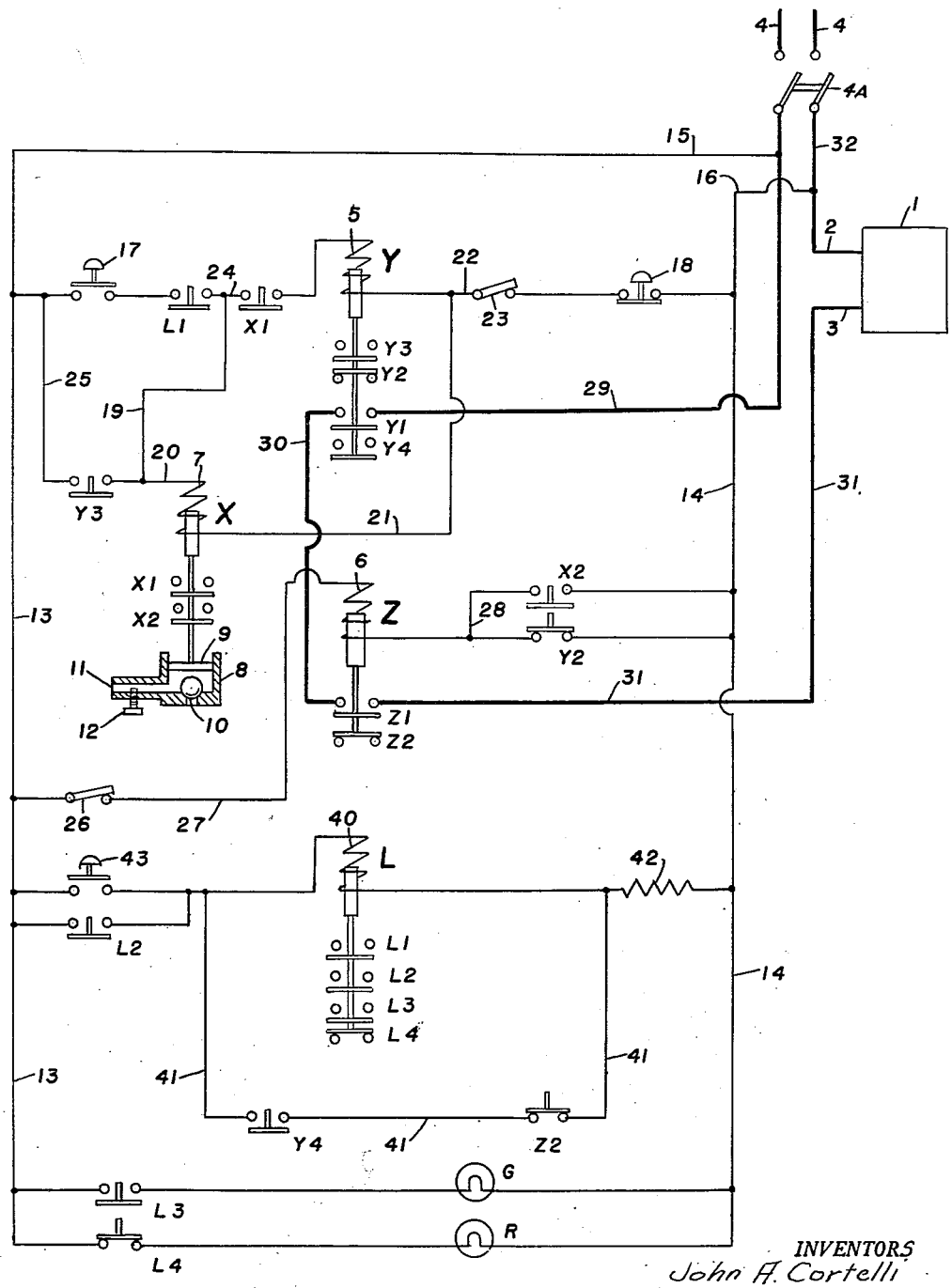

In Fig. 5 is reproduced the embodiment of that part of the invention of Figs. 1 to 4 and with the addition of a signalling system for purposes referred to hereinbefore.

The contactor Y has an additional normally open contact Y4, and the contactor Z an additional normally closed contact Z2.

A signal lamp contactor L is provided having an energizing winding 40, and normally open contacts L1—L2—L3 and normally closed contacts L4.

The contact L1 is reproduced in the upper part of the figure, in series with the start contactor 17.

A bridging loop 41—41 comprising contacts Y4 and Z2, bridges the winding 40.

At times in operation when the contacts Y4 and Z2 in the loop 41—41 are both closed, the winding 40 of contactor L will be short circuited by the loop (a resistor 42 being provided to limit the current), and contactor L cannot operate, or if operated will restore. But if either contact Y4 or Z2 is open, the short circuit is broken and contactor L can operate or stay operated.

A green lamp G, connected across the mains 13—14, lights up upon closure of contacts L3 in series therewith; and a red lamp R similarly connected similarly lights up when contacts L4 are closed.

Parts not thus far described are described in the following description of the signal operation.

The contactor Y cannot be closed to initiate current to the apparatus 1, upon closure of contacts 17 as described for Fig. 1 until signal lamp contactor L is operated to close contacts L1 in series with contactor 17.

Contactor L must therefore first be operated and is operated by momentary closure of a manual, normally open contactor 43 in series with the winding 40 across main 13—14; and is then held operated by closed contacts L2 bridging contactor 43 and contactor 43 may be released to open.

Contactor L being operated, the red lamp contacts L4 are open and green lamp contacts L3 are closed and the green lamp G lights up signalling that the control is in condition to be used.

If contactor L does not operate normally, the red lamp R is on through contacts L-4 signalling that fact.

As described for Fig. 1, contactors Y and Z may now be operated to initiate main current, and they close contacts Y4 and open contacts Z2 in the loop 41—41 and contactor L remains operated and the green lamp G stays on.

If the secondary device or contactor Z were not in safe normal operative or functioning condition when contactor Y operated, the loop circuit 41—41 would be closed by contacts Z2 remaining closed and by closing of contacts Y4, and contactor L would therefore restore as described and cut off the green lamp G and light up the red lamp R, signalling that fact; and contacts L1 being then opened, the control could not be used until contactor Z was replaced or repaired.

When contactor L is operating normally and both contactors Y and Z have operated or functioned normally, the green lamp G stays on.

When either the actuating contactor 23 or the emergency contactor 18 is opened to effect interruption of the main current, contactor Z remains operated and contactor Y alone normally restores and interrupts the current as described for Fig. 1; and the loop circuit 41—41 is then open at both contacts Y4 and Z2 and contactor L stays operated and the green lamp G stays on, signalling that the control has operated normally; and that it may be operated again.

If however contactor Y failed to restore and interrupt the current, and contactor Z subsequently restores to interrupt it, the loop circuit 41—41 would be closed by contacts Y4 remaining closed and by contacts Z2 closing; the contactor L would then restore, closing contacts L4 to light up the red lamp R and opening contacts L3 to cut off the green lamp G, and the red lamp would indicate that it was the reserve contactor Z that opened the circuit; and contactor L being restored, opening contacts L1, the control could not be again operated until contactor Y was replaced or repaired thus saving contactor Z from further deterioration by use.

With the control of Figs. 1 to 5, the main current when once initiated flows continuously until interrupted in case of emergency; or flows continuously until some event at the apparatus dictates interruption.

Figure 6:
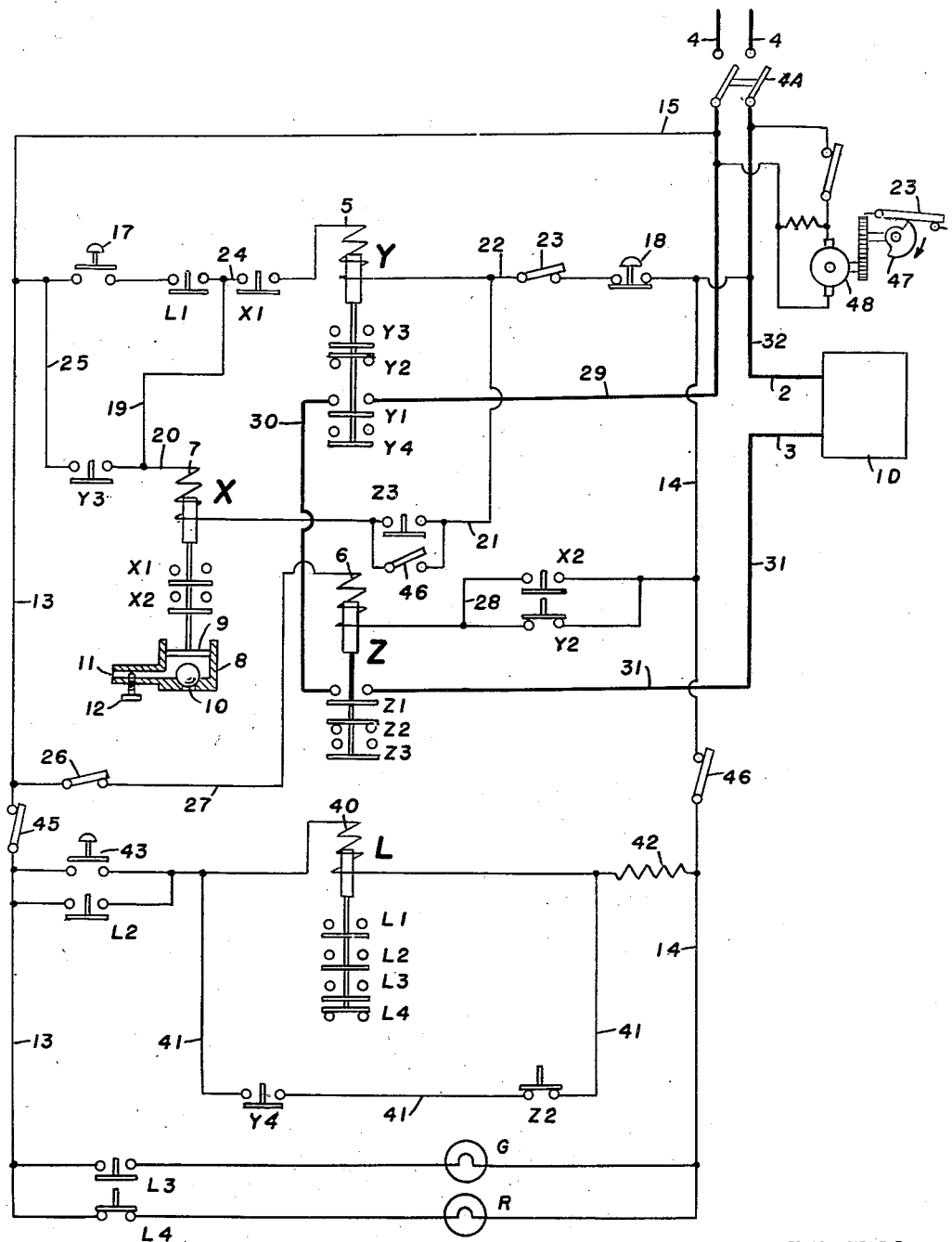

In Fig. 6 is illustrated a control for repeatedly initiating and interrupting the apparatus current by a contactor Y as a primary control device and upon failure of contactor Y to interrupt, then, as one mode of operation, a contactor Z as a secondary control device interrupts the current and shuts down the apparatus.

As an alternative mode of operation provision is made in Fig. 6 for the contactor Z to take on the function of repeatedly initiating and interrupting the apparatus current, upon failure of contactor Y to do so, when shutting down of the apparatus must be prevented until some operation or process has been completed by it, to avoid loss.

Fig. 6 includes a signalling system which may be used or not as desired by closing or opening contactors 45—46 in the control mains 13—14.

The control system of Fig. 6 is in most parts similar to that completely described for Figs. 1 and 5 and has many of the same reference characters, so that a brief description will suffice.

Contactors Y and X have the same contacts as in Fig. 5; and contactor Z has additional contacts Z3, normally open.

The contacts Z3, where reproduced in the control system, have a short circuiting contactor at 46 for optionally bridging them.

For the first said mode of operation, the bridging contactor 46 is opened.

Upon closing start contactor 17, to start, contactors Y, Z and X operate as described for Figs. 1 and 5 and contactor Z closes the additional contacts Z3.

Current to the apparatus, here 1D, then flows through the contacts Y1 and Z1 as described.

The apparatus 1D has a timer that periodically opens and closes the contactor 23. It may be any kind of a timer, suitable for the art in which the apparatus 1D is used. That shown as an example is a rotary cam device 47 driven by a motor 48 connected to the mains 4—4 independently of energization of the apparatus 1D.

When the contactor 23 is opened by the timer 47, the contactor Y normally interrupts the apparatus current at its contacts Y1, and contactor Z is held closed as described for Figs. 1 and 5, holding contacts Z3 closed.

When contactor 23 is closed again, by the timer, contactor Y again initiates current to the apparatus 1D, and so on repeatedly.

If contactor Y should function abnormally and not interrupt the periodic apparatus current, when the timer opened contactor 23, contactor Z will restore and stay restored and interrupt the apparatus current as described for Figs. 1 and 5 and this will shut down the apparatus 1D.

Restoring of contactor Z opens contacts Z3, so that when the timer again closes contactor 23, Z remains restored and keeps the apparatus 1D shut down, because Y2 being open, X2 must be closed by operation of contactor X before contactor Z can operate; and contactor X cannot be operated because contacts Z3 in line with its winding 7 are open.

For the said alternative mode of operation, bridging contactor 46 is closed, rendering contacts Z3 ineffective.

Contactor Z operates closing contacts Z1.

Contactors X and Y then operate.

Contactor Y closes contactor Y1 and completes the apparatus current circuit.

When the timer opens and again closes contactor 23, contactor Y interrupts and then reestablishes the apparatus current repeatedly, as before.

When the timer opens contactor 23, if contactor Y should fail to restore to interrupt the current, contactor X will be deenergized and restored and contactor Z will be deenergized and restored, and contacts Z1 will interrupt the apparatus current.

In this case however, when the timer again closes the contactor 23, contactor X is energized by current through the contactor 23, by wire 21, closed contactor 46, winding 7 of contactor X and closed contacts Y3, and contactor X operates closing contacts X2, and this operates contactor Z to again to initiate the apparatus current; and when contactor 23 is again opened by the timer, contactor X restores and opens contacts X2 which causes contactor Z to restore and interrupt the apparatus current, and so on, repeatedly, contactor Z thus taking over the function of contactor Y to periodically make and break the apparatus current.

The signalling system of Fig. 6 operates the same as described for Fig. 5 during the first said mode of operation.

For the said alternative mode of operation, when the contactor Y fails to restore and the contactor Z begins to operate periodically, the loop circuit 41—41 is closed at the contacts Y4, and contacts Z2 periodically open and close. When they close, the red lamp R comes on alone, and when they open the green lamp G comes on alone, and thus by alternately flashing red and green, they signal that the contactor Z has taken over the control of the apparatus current. Accordingly, when the time comes when the apparatus 1D can be shut down without loss, it is known that the substitute or reserve contactor Z has been working in place of the contactor Y, and both can be put into unimpaired condition before another operation of the apparatus.

In Fig. 7 is illustrated an application of the invention in an art wherein a machine 1E operates cyclically, being started on the cycle when current in the lines 2—3 is initiated and energizes a machine driving motor 49 and releases a series wound motor brake 50; and being stopped at the end of the cycle by interruption of the current to set the brake 50 and stop the motor 49.

The machine 1E is illustrative of a general class of machines having moving parts that might injure machine tending and serving workmen, if standing close to it; and particularly might injure them if the machine did not stop at the end of its cycle but unexpectedly started another cycle.

An illustrative example of such machines is a reciprocatory press.

It is therefore vitally important that the current to the motor 50 be infallibly interrupted to stop the machine at the end of the cycle.

To this end a primary control device is provided to normally interrupt the current at the end of the cycle; but if it should fail to do so, a secondary control device which is normally inactive, is automatically brought into action to interrupt the current and stop the machine; according to the purposes of the invention as referred to.

Provision is also made to insure that the workmen who control operation of the machine 1E will of necessity have to take up positions clear of and at a safe distance from the machine in order to initiate a cycle and remain in such positions until the cycle has proceeded to a stage at which there is no liability of injury to them; this provision being in accordance with the hitherto developed control systems referred to hereinbefore which insure safety to the workmen so long as the control devices themselves of the system function normally.

Fig. 7 comprises numerous parts similar to those of the preceeding figures and having the same reference characters, and a briefer description than otherwise will suffice.

The machine 1E has limit switches or contactors LS1 and LS2, operated by rotary cam devices 51—52 rotably driven by the machine; the cam devices being illustrated in their positions at the beginning of the cycle, and driven by a machine shaft 53 to make one revolution per cycle.

The switch LS1 is normally closed at the beginning of the cycle and the cam device 51 momentarily opens and then again closes the switch at some stage of the cycle.

The switch LS2 is normally held open by the cam device 52 at the beginning of the cycle, and the cam device allows it to close at some stage of the cycle, for example when it is about half completed.

A primary control device or contactor Y is provided like that of Fig. 5; and a secondary control device or contactor Z is provided, like that of Fig. 5; and a contactor X is provided like that of Fig. 5 but having additionally normally closed contacts X3.

A safety contactor S is provided having a winding 54 and normally open contacts S1, S2.

A signal lamp contactor L is provided like that of Fig. 5.

Parts not described above for Fig. 7 will be described in the following description of operation; the description being brief in view of the description of preceeding figures.

Upon closing main switch 4A which puts potential on control mains 13—14, contactor Z operates, the winding 6 being energized through closed contacts Y2, and it opens contacts Z2 and closes main current contacts 21.

The signal contactor L is operated by closing manual contactor 43, and it closes contacts L1, L2, L3 and opens contacts L4; and is held operated on release of contactor 43 by closed contacts L1.

Contacts L3 being now closed and contacts L4 being open, the green lamp G comes on alone and signals that the system is in condition to be operated.

A number of push button contactors 55—55 are provided, preferably one for each workman at the machine 1E, two being shown, and located at a safe distance from the machine; and comprising each, normally closed contacts 56 and normally open contacts 57. Before the machine can be started on its cycle all of these push button contactors must be released by all of the workmen to close contacts 56—56.

Thereupon, winding 54 of contactor S is energized across the mains 13—14 through contacts 56—56, closed contacts X3, and closed contacts L2, in series.

Contactor S operates closing contacts S1 and S2.

Limit switch LS1 being closed as described, and contacts S1 now being closed, a bridging circuit for the contacts 56—56, X3 and L2 is made therethrough; and the push button contactors 55—55 can be pushed down to close contacts 57—57, and contactor S will be held operated.

All of the contactors 55—55 must be held down by all of the workmen, insuring that they will be in safe positions, and thereupon, winding 7 of contactor X is energized across the mains 13—14 through closed contacts 57—57 and closed contacts S2 in series; and contactor X operates closing contacts X1 and X2 and opening contacts X3.

Upon closing of contacts X1, winding 5 of contactor Y is energized across the mains through contacts X1, closed contacts S2, and 57—57, and it operates closing contacts Y1, Y3 and Y4 and opening contacts Y2.

Current to the motor 49 is now established by the two contactors Y and Z through their closed contacts Y1 and Z1.

When contactor Y operated and closed contacts Y4, if contactor Z had not already operated, its contacts Z2 would be closed, and the loop circuit 41—41 would be closed and the contactor L would restore and open green lamp contacts L3 and closed red lamp contacts L4 thus signalling by the red lamp R that the contactor Z had not operated and must be replaced or put in good condition so that it can be relied upon to take over the function of contactor Y later, if necessary.

If contactor Z did operate, as referred to, then after contactor X operated, contactor Z is held operated by contacts X2, and opening of contacts Y2 by operation of contactor Y will not affect it.

Upon the operation of both contactors Y and Z the circuit, 2—3—31—30—29 to the motor 49 is closed and the motor starts the machine cycle.

The workmen must remain in safe positions and hold all of the contacts 57—57 closed. If any one of them releases his push button contactor 55 and allows its contacts 57 to open, winding 5 of contactor Y would be deenergized and it would restore and break the motor current at its contacts Y1 and set the brake 50 and stop the machine.

The opening of any contact 57 by a workman also deenergizes winding 7 of contactor X and it restores. If contactor Y failed to restore and stop the press, then contactor X would open contacts X2 which alone are holding contactor Z operated (contacts Y2 being open) and contactor Z would restore and break the motor current on its contacts Z1 and stop the press, according to the invention.

This fact would be signalled by the coming on of the red lamp R alone, because restoring of contactor Z would close contacts Z2, and, contacts Y4 being closed, contactor L would restore and close the red lamp contacts L4 and open the green lamp contacts L3.

With the system operating normally by the workmen holding the contacts 57—57 all closed as described, the machine cycle goes on until the machine is safe for workmen to be near it, and at this time limit switch LS2 closes; and together with closed contacts Y3, bridges the push button contacts 57—57 and the push buttons can be released, without disturbing the control; and contactors Y, Z, X and L remain operated.

At the end of the cycle, switch LS2 is opened by the machine. Assuming that the push button contactors 55—55 have been released and have opened contacts 57—57, this de-energizes the windings 7 and 5 of contactors X and Y and they restore.

Contactor Y, in its normal operation, restores and breaks the machine current at its contacts Y1 to stop the machine. This also closes contacts Y2.

If contactor Y failed to restore and break the machine current, then as described, contacts Y2 will be held open; and contactor X, upon restoring will open contacts X2 and contactor Z will then restore and break the machine current at its contacts Z1 and stop the machine; and this fact will be signalled by the red lamp R, by closing the loop circuit at Z2 and Y4 and causing contacts L3 to open and contacts L4 to close.

Before the end of the normal working cycle, and before limit switch LS2 opened, limit switch LS1 is opened and closed again. This deenergized winding 54 of contactor S and it restored and opened contacts S1 and S2.

If the workmen had failed to release their push button contactors 55—55 by the time the machine was stopped by the opening of limit switch LS2, it would be without effect, because contacts S2 would be open.

If due to failure of contactor Y to restore and stop the machine, and contactor Z restores and stops it, signal contactor L will be restored, because Z2 and Y4 will both be closed. This opens contacts L2. The main current cannot again be initiated by closing the push button contactors to operate contactor Z, because the winding 6 of contactor Z has to be energized through either the contacts Y2 or X2; and contacts Y2 are open; and contacts X2 cannot be closed except by operating contactor X; and winding 7 of contactor X cannot be energized through the push button contacts 57 unless S2 is closed; and S2 is open due to restoring of contactor S.

Again, when contactor Z has restored in place of contactor Y to break the machine current, contactor S cannot first be closed by releasing the push button contactors to close contacts 56—56 with the undesired result of again making it possible to again operate contactor Z, because when contactors Z restored it caused contactor L to restore as described, and this opened contacts L2 in series with the push button contacts 56—56.

Thus the system actuated by the workmen to start and operate the machine insures that they will be at a safe distance from the machine at all times in its cycle of operations in which they could conceivably be injured; and the liability of injury is confined to abnormal functioning or failure to function of a primary device, here the contactor Y, which effects starting and stopping of the machine; and this liability of injury is insured against by a secondary device, here the contactor Z, which is always in safe operating condition due to being normally idle and inactive but which takes over the function of the primary device if the latter should function abnormally or fail to function.

In Fig. 8 is illustrated diagrammatically an embodiment of the invention in which the apparatus, here 1F is operated by fluid pressure, in this instance, air pressure; and in which the primary and secondary devices are valve devices YV and ZV controlling the supply of air pressure to the apparatus; the device YV normally functioning to interrupt the supply, but if it should fail to do so, the valve device ZV, normally inactive, comes into action and performs the interruption function for the valve device YV; according to the principle of the invention.

The valve devices YV and ZV are operated by electromagnetic devices Y and Z, having windings 5 and 6, and the control system is therefore part an electric system and part a fluid pressure system. The electric part of the control system except as to the windings 5 and 6, has not been shown, for simplification; and it will be understood that it may be like those of Figs. 1 to 6 from the following.

In Figs. 1 to 6, the electromagnetic devices Y and Z are operated or restored by energization or deenergization of their windings 5 and 6, under control of the actuating contactor 23; or emergency contactor 18; or contacts 23 jointly with contacts Z3 and 46; for various modes of operation.

In Fig. 8 the windings 5 and 6 may be considered as energized and deenergized in the same manner as in Figs. 1 to 6 by the same contacts, for the same modes of operation; the identification of the electric part of the system with Figs. 1 to 6, being made by the showing of the contactor 23 at the apparatus 1F, and the system contacts Y2, Y3 and Y4 on the device Y, and the contacts Z2, Z3 on the device Z, and further, upon noting that the valve devices YV and ZV take the place of the main current contacts Y1 and Z1 of Figs. 1 to 6.

Referring to Fig. 8, the valve devices YV and ZV may be alike for purposes of economy; and the reference characters for the device YV are the same as those for the device ZV but with the suffix A; and the device ZV only, need be described.

The device ZV comprises an enclosing walled housing 58 having an inlet port 59 and containing a pair of axially spaced valves 60—61 connected together. The valve 60 is biased by a spring 62 to normally close a valve port 63, and the valve 61 is biased by the spring to normally hold open a valve port 64. An outlet port 65 is provided between the valves; and an exhaust port 66 is provided beyond the valve port 64.

A valve stem 67 for moving the connected valves against biasing force of the spring 62, extends outwardly through an opening 68 in the housing wall.

A bell crank 69, pivoted at 70 has one arm engaging the end of the stem 67 and the other arm connected at 71 to the moving parts operated by the winding 6.

Air under pressure is supplied from a source indicated at 72, by a conduit 73 to the inlet port 59 of device ZV; and a conduit 74 connects the outlet 65 of device ZV to the inlet port 59A of the device YV. The outlet port 65A of device YV is connected by a conduit 75 to the apparatus 1F, to operate it.

When the windings 5 and 6 of both devices Y and Z are energized, the bell cranks 69 and 69A will both be rocked (counterclockwise in the drawing) and the valves 61—61A will close the ports 64—64A; and the valves 60—60A will open the ports 63—63A.

Fluid pressure can then flow from conduit 73 through inlet port 59, valve port 63, outlet port 65, by conduit 74 to inlet port 59A, valve port 63A, outlet port 65A, conduit 75 to the apparatus 1F.

In normal operation, upon deenergizing the winding 5 of device Y, it will restore, and the spring 62A will restore the valve device YV, closing valve port 63A, cutting off supply of pressure from the conduit 74, and opening valve port 64A; and pressure operating the apparatus 1F and in the conduit 75 will exhaust through the outlet port 65A, valve port 64A and out at the exhaust port 66A to atmosphere thus interrupting pressure at the apparatus.

Upon again energizing winding 5, pressure will again be applied to the apparatus; and by like operation the pressure may repeatedly be applied to and exhausted from the apparatus.

If, however, when the winding 5 is deenergized, the device Y should fail to restore; or if, upon restoring of the device Y, the valve device YV should fail to restore; then, the operation of the electric part of the system (as described for Figs. 1 to 6) will deenergize the winding 6 of electromagnetic device Z and cause it to restore, and the spring 62 will restore the valve device ZV and exhaust the pressure from the apparatus 1F through conduit 75, port 65A, open valve port 63A, and port 59A of valve device YV, through conduit 74, port 65, open valve port 64, and outlet port 66 of valve device ZV. At the same time, the valve 60, closing valve port 63, cuts off supply pressure in the conduit 73. The devices Z and ZV thus performing the functions of the devices Y and YV upon failure of either of the latter; in accordance with the invention hereof.

The actuating contactor 23, which as described for Figs. 1 to 6, is opened to effect deenergization of the winding 5 of device Y, and, upon failure thereof to effect deenergization of winding 6, may be opened by various means at the apparatus 1F; one way, as an illustrative example, comprising a cylinder and piston device 76 communicating with pressure in the apparatus 1F; and having a piston rod 77 normally retracted by the bias of a spring 78, but which, upon attainment of a predetermined pressure as the result of some operation of the apparatus, or because of excessively high pressure due to any cause, it moved against the spring bias and opens the contactor 23.

Obviously the emergency contactor 18 of Figs. 1 to 6 may be the actuating contactor for the described purposes.

In Fig. 9 is illustrated an embodiment of the invention, similar to the described embodiment of Fig. 8, but in which the fluid pressure is liquid pressure.

Many of the parts are the same as in Fig. 8, and have the same reference characters and need not again be described. The differences are as follows.

Liquid is supplied under pressure from a reservoir 79 by a pump 80 to a conduit 81 and thence to the inlet port 59 of valve device ZV.

The outlet port 65A of device YV is connected by a conduit 82 to the intake side of a hydraulic motor 83, which drives the apparatus, here 1G, by a shaft 84, the discharge side of the motor being connected to a return conduit 85 returning liquid to the reservoir 79.

The exhaust ports 66 and 66A of the devices ZV and YV are connected by conduits 86—87 to the return conduit 85.

The contactor 23 is in this case, as an illustrative example, operated to be opened by a revolution of a cam device 87 rotated by a shaft 89 connected to some rotary part of the driven apparatus 1G.

Operation of this embodiment of Fig. 9 is in general the same as that of Fig. 8. Deenergization of winding 5 of device Y by contactor 23, and the consequent restoring of it and of valve device YV, cuts off operating pressure from the apparatus 1G; and upon failure of Y or YV to do so, the winding 6 of device Z is deenergized, and the devices Z and ZV restore and cut off the pressure according to the invention.

In Fig. 9 since the valve devices ZV and YV control liquid, it may be desirable to provide packing glands 90 and 90A to seal the reciprocatory valve stems 67 and 67A.

It will be understood as referred to that with the complete electric part of the control systems of Figs. 1 to 6 applied to Figs. 8 and 9, the various modes of operation of Figs. 1 to 6 may be had with the embodiments of Figs. 8 and 9 by corresponding operation of the actuating contactors 18, 23 and 46.

Fig. 10 illustrates an embodiment of the invention in which the apparatus here 1H, is a cyclically operating machine, the machine chosen as one illustrative example being a reciprocatory press. The machine, as will be described, is started and stopped, respectively, by communicating fluid pressure to it to set a clutch, and by cutting off the fluid pressure to allow a spring biased brake to set; the fluid pressure in this illustrative case being air pressure.

The machine 1H is another one of the general class, referred to in conection with Fig. 7 having moving parts that might injure workmen serving the machine if standing too close to it, particularly if the machine should fail to stop at the end of a cycle and should unexpectedly start another cycle.

It is therefore vitally important that the air pressure communicated to the machine be infallibly cut off to cause the brake to set to stop the machine at the end of the cycle.

To this end, a primary valve device, operated by a primary electromagnetic device, is provided to communicate pressure and to cut it off as referred to. If either the electromagnetic device or the valve device should function abnormally or fail to perform the function of cutting off the pressure, a normally inactive secondary electromagnetically operated valve device comes into action and performs the function of cutting off the pressure; according to the invention.

The control system of Fig. 10 is in general similar to that of Fig. 7 the principal difference being that Fig. 7 supplies main current to the apparatus at the contacts Y1 and Z1, and interrupts it at the contacts Y1 or Z1; whereas in Fig. 10 fluid pressure is supplied through valve devices YV and ZV and is cut off at the valve device YV or ZV, the valve devices YV and ZV in Fig. 10 being in effect substituted for the contacts Y1 and Z1 of Fig. 7.

Fig. 10 has the provision described for Fig. 7 of making it necessary for the attending workmen to take up positions of safety to initiate a machine cycle and to remain in such safe positions until the cycle has proceeded to a stage at which there is no liability that they would be injured.

Fig. 10 therefore comprises numerous parts similar to those of Fig. 7 and they have been given the same reference characters as in Fig. 7, so that a brief description of Fig. 10 will suffice.

The machine 1H is illustrated diagramatically as comprising a main shaft 91 on which is splined for axial movement, a clutch and brake element 92, connected to a flanged head 93.

An air pressure cylinder 94 has a piston 95 therein, normally retracted toward the right, as viewed, by a spring 96 and propelled toward the left against the spring force upon communicating pressure to the cylinder through an inlet port 97. A piston rod 98 is connected at its outer end to the head 93 in a manner to allow the head to rotate relative to the piston rod, but to cause the piston 95 to reciprocate the head, and therewith, the splined brake and clutch element 92.

When the clutch and brake element 92 is reciprocated toward the left, by air pressure in the cylinder 94, it is thereby frictionally engaged with a clutch element 99 on a gear 99A rotating idly on the main shaft 91 and driven by a power motor 100, whereby motor power is applied to the machine shaft 91 through the gear 99A, clutch ring 99 and splined element 92 to start a machine cycle.

When the clutch and brake element 92 is reciprocated toward the right by the cylinder-contained spring 96, the described clutching engagement is interrupted and the element 92 is engaged with a stationary brake element 101 which brakes and stops the element 92 and the main shaft 91 spline connected to it, to stop the machine.

The parts above described are shown diagramatically but are illustrated in more complete detail and more completely described in the patent of O. M. Bundy, issued October 13, 1942, No. 2,299,007 to which reference may be had.

The machine 1H of Fig. 10 has limit switches or contactors LS1 and LS2, operated by rotary cam devices 51 and 52 rotatably driven by the main shaft 91, the cam devices being illustrated in their positions at the beginning of a cycle.

The switch LS1 is normally closed at the beginning of the cycle and the cam device 51 momentarily opens and then again closes the switch at a predetermined stage of the cycle.

The switch LS2 is held open by the cam device 52 at the beginning of the cycle and the cam device allows it to close at a predetermined stage of the cycle, for example when it is about half completed.

Valve devices ZV and YV, and electromagnetic devices Z and Y for operating and restoring them, upon energization and deenergization of windings 6 and 5 of the electromagnetic devices, are provided, and for brevity of description these have been reproduced with the same reference characters from Fig. 8 and the description thereof for Fig. 8 applies to Fig. 10.

A source of air pressure is indicated at 102 and is communicated by a conduit 103 to the inlet port 59 of valve device ZV; and the outlet port 65 of valve device ZV is connected to the inlet port 59A of device YV by a conduit 104; and the outlet port 65A of valve device YV is connected by a conduit 105 to the inlet port 97 of the clutch and brake operating cylinder 94.

The contacts operated by the magnetic devices X, Y, Z and L; and the circuits actuated and controlled thereby; and the control of the energization and deenergization of the windings 5, 6, 7 and 40, all being the same (with the execeptions noted above) as described for Fig. 7, including the mode of operation of the circuits for protection of the operators, and the mode of operation of the red and green signals; the operation of Fig. 10 will be apparent from the following brief description.

In normal operation, the winding 6 of magnetic device Z and the winding 5 of magnetic device Y are both energized when the operators have operated all of their push button contactors 55—55; and the valve devices ZV and YV are operated thereby, and jointly communicate air pressure from the source 102 to the cylinder 94, by way of conduit 103, inlet port 59, open valve port 63, outlet port 65, conduit 104, inlet port 59A, open valve port 63A, outlet port 65A, conduit 105, and cylinder inlet port 97.

This releases the described brake 92—101 and engages the described clutch 92—99 and starts the machine cycle.

The limit switch LS2 closes and takes over the control from the operators at the predetermined stage of the cycle.

At the end of the cycle, the limit switch LS2 opens again, and deenergizes winding 5 of magnetic device Y, and the latter restores, and allows valve device YV to be restored by its spring 62A; and this closes valve port 63A; and source pressure in the conduit 104 is thereby cut off.

Restoring of valve device YV also opens valve port 64A, and pressure in the cylinder 94 exhausts to atmosphere, back through cylinder port 97, conduit 105, port 65A, open valve port 64A and out through outlet exhaust port 66A.

The spring 96 in the cylinder 94 thereupon sets the brake 92—101 and stops the machine at the end of its cycle; and the machine is ready for another cycle.

If however, the magnetic device Y should fail to restore as described, or, if it should restore but the valve device YV should fail to restore, or for any other reason fails to cut off the source pressure to allow the spring biased brake to set, the winding 6 of magnetic device Z will be deenergized and restore and allow spring 62 to restore the valve device ZV; and the latter upon restoring will close the valve port 63 and thereby cut off source pressure in the conduit 103, and will also open valve port 64, and pressure in the cylinder 94 will be exhausted back through its port 97, through conduit 105, port 65A, valve port 63A, port 59A, conduit 104, port 65, open valve port 64, and out to atmosphere through outlet exhaust port 66; thereby allowing the spring 96 to set the brake and stop the machine; in accordance with the purposes of the invention.

The signal system of Fig. 10 is illustrated as the same as that of Fig. 7 and need not be again described.

Substantially the same signals by the red lamp R and green lamp G are provided as described for Fig. 7.

In Fig. 10, the fluid pressure is air pressure; and it is believed that it will be apparent how it may be adapted to liquid pressure, in view of the showing of Figs. 8 and 9, without further illustration or description.

In the foregoing, the invention has been described as embodied in all-electric systems Figs. 1 to 7; and in part-electric, part-fluid-pressure systems, Figs. 8 to 10.

In Fig. 11A—11B, to illustrate the scope of the invention, an all-fluid pressure embodiment is shown, the fluid pressure being air pressure. This embodiment corresponds, in mode of operation, end results, safety features etc. to the electric-fluid-pressure embodiment of Fig. 10; and in some instances the same parts are reproduced from Fig. 10 with the same reference characters to identify them with the parts of Fig. 10, but with the suffix "V" or "P"; and a briefer description than otherwise will therefore suffice.

Valve devices YV and ZV are illustrated as being the same as in Fig. 10; and a source of air pressure at 102 supplies air pressure to a conduit 107 and thence by conduits 106 and 103 to the valve device ZV and thence by a conduit 104 to the valve device YV, and thence by a conduit 105 to a press 1H having a cylinder and piston, 94—95, to release a brake 92—101 and set a clutch 92—99 or to allow the clutch to be released and the brake to be spring set, when air pressure is, respectively supplied to or exhausted from the cylinder 94 by way of conduit 105 as described for Fig. 10. The press 1H operates valves LS1V and LS2V by cams 51—52 in place of the contactors LS1 and LS2 of Fig. 10.

As will become apparent, and similarly to Fig. 10, the valve device YV normally admits pressure to the cylinder 94, to start a cycle of the machine 1H and cuts off the air pressure and exhausts the cylinder to stop the press at the end of the cycle; but if it should fail to cut off and stop the press, the valve device ZV, normally inactive, comes into action and performs the function of the valve device YV and stops the press; in accordance with the invention.

The other parts of the fluid pressure system of Fig. 11A—11B (corresponding to the electric system of Fig. 10) will now be described in connection with a description of operation.

Air pressure from the source 102 is supplied to a main conduit 107.

In the line of a conduit 108—109 connected to the conduit 107, is a piston valve 43V; shown diagrammatically as comprising a stationary cylinder 110 and a valve piston 111 reciprocable therein. Opposite pairs of ports 112—112 and 113—113 are provided through the cylinder wall;

and a duct 114 through the piston is alignable with the respective pairs of ports upon reciprocating the valve piston. The ports 113—113 communicate with the conduit 108—109; and the ports 112—112 communicate with a branch conduit 115 from the conduit 109 and with an exhaust conduit 116.

This construction of piston valve is used in other places in the system and in view of this complete description of one of them, others will not be fully described in detail in every instance.

The piston valve 43V is of the push button type normally held upward by a spring 117 to exhaust the conduit 109 through the duct 114 and block off the conduit 108; and has a push button head 118 for moving the valve cylinder down, to cut off exhaust and open the conduit 108—109.

At LP is a diagrammatically illustrated double piston and cylinder device comprising a cylinder wall 119 and a transverse wall 120, providing two cylinders 121—122. Pistons 123—124 in the cylinders are connected by a rod 125 going sealedly through the wall 120 to isolate the cylinders 121—122.

The upper piston 123 has a piston rod 126 engaging the under side of an arm 127 pivoted at 128 to rock it up and down with movements of the pistons. A spring 129 constrains the arm 127 and pistons 123—124 to move to down positions.

The cylinder 121 has a communicating port 130 through its wall; and the cylinder 122 has two ports 131—132 through its wall.

This construction of double cylinder and piston and arm is used in other places in the system and in view of this complete description of one of them, others will not be completely described.

It will be seen that in the normal position of piston valve 43V its duct 114 exhausts pressure from the upper cylinder 121 through port 130 and conduits 109—115.

A conduit 133 is connected to the conduit main 107, and continues at 134—135—136. Between the conduit parts 133—134 is another piston valve L1V normally blocking off pressure in the conduit 133 and exhausting pressure from the lower cylinder 122 through port 131 and conduit 134 and a branch conduit 137, and valve duct 138.

In the line of conduit parts 135—136 are two piston valves Z2V and Y4V, having respectively valve ducts 139 and 140, both of which valves may be moved to positions to jointly exhaust the lower cylinder 122 by way of port 132, and the valve ducts 139 and 140; and either of which may be moved to a position to block off said exhaust.

Resting on the arm 127 are piston valves L1V, L2V, L3V and L4V (fragmentarily shown but reproduced in full elsewhere in the figure) which will be moved upwardly when the arm 127 is rocked upwardly.

At ZP is another double piston and cylinder device by which, when pressure is communicated to either its upper cylinder 182 or lower cylinder 183, it will rock upwardly a pivoted arm 184 and raise the aforesaid valve Z2V; and also operate the main valve device ZV by raising its valves 60 and 61 by the valve stem 67 (as described for Fig. 10).

The cylinder of device ZP may receive pressure from conduit 106 by branch conduits 185—186, controlled respectively by valves X2V and Y2V; and in the normal position of these valves, with pressure in the conduit 106, the lower cylinder receives pressure by way of a duct 187 of the valve Y2V, and the cylinder 182 exhausts through a duct 188 of the valve X2V; so that valve Z2V referred to above, is normally in the raised position before operation of the system is initiated.

As to the operation of the part of the system thus far described, the cylinders 121 and 122 of device LP are both normally exhausted, and the valves L1V to L4V are down, and valve Z2V is up, as described, and valve Y4V is down as will be described.

Upon depressing the push button valve 43V, the duct 114 connects the ports 113—113 and pressure from conduit 107 goes by conduits 108—109, port 130, to cylinder 121 and raises the piston 123 and therewith the arm 127 and the said valve L1V among others supported by it. Pressure then goes from conduits 107—133 through duct 138 of valve L1V, conduit 134, port 131 to cylinder 122. Valve L1V is thus substituted for valve 43V and the latter can be released and will exhaust the upper cylinder 121 by its valve duct 114, and the arm 127 will be held up by piston 124.

Two of the piston valves raised by the arm 127 are the valves L3V and L4V, reproduced in the lower part of the diagram. Valve L3V, upon rising, opens a conduit line from conduit 107, through a conduit 141, valve duct 142 and conduit 143 to a pressure switch 144, which thereupon operates and closes contacts 145 and makes an electric circuit across supply mains 146—147 through a green signal lamp G, illuminating it.

If for any reason the piston and cylinder device LP did not operate as described, or if during operation of the system it should for any reason restore, thereby restoring valves L3V and L4V to their illustrated positions, the valve L3V would exhaust the pressure switch 144 through the valve duct 142; and pressure from conduit 107, through conduits 148 and 149 and valve duct 150 of valve L4V would operate another pressure switch 151 and close contacts 152 and make an electric circuit across the mains 146—147 through a red signal lamp R. But with the device LP operated and valve L4V held up, the pressure switch 151 restores by exhausting through the conduit 149 and a branch conduit 153 and the duct 150; and contacts 152 are held open.

The pressure switches 144 and 151 are preferably alike and of any well known construction. The switch 144 as shown diagramatically comprises a bridging contact 154 connected to a piston 155 normally retracted by a spring 156 in a cylinder 157, and a port 158 through the cylinder wall for admitting air pressure from the conduit 143.

Lowering of the arm 127 as referred to and causing the green lamp to go out and the red lamp to come on, will occur upon the occurrence of fault in the system to be described, when valves Z2V and Y4V are both at the same time in position to exhaust the cylinder 122 through their ducts 139 and 140 in series.

The push button valve 43V having been momentarily depressed, and the piston and cylinder device LP thereupon having operated and raised the valves L1V, L2V, L3V and L4V by the arm 127; and the piston valve L1V having substituted for the valve 43V and the latter released; and valve Z2V being up and valve Y4V being down; and the raised valve L3V having turned on the green lamp G, the rest of the system is green-signalled thereby to be operated.

Pressure from the source 102, Fig. 11B, is controlled by a two position manually rotatable valve 189 of well known form which in the position illustrated, blocks off pressure from the source 102 and exhausts the entire system; and which when rotated 90 degrees clockwise admits pressure from the source 102 to the conduit 107.

In the upper left part of the diagram, Fig. 11A, is a conduit main 159 connected to the main 107 through a two position rotary manual valve 160 of well known form, which in the position illustrated, blocks off pressure from the main 107, and exhausts the conduit 159 but when rotated 90 degrees counterclockwise will communicate pressure from the main 107 to the main 159.

Pressure in the main 159 is communicated to four conduit lines indicated generally at 161, 162, 163 and 164.

In series in the conduit line 162, are the upper parts of two push button valves 165—165; a valve X3V; and the aforesaid valve L2V; all jointly controlling air pressure to the lower cylinder 166 of a double piston and cylinder device SP.

In series in the conduit line 161 are the aforesaid machine-cam-operated valve LS1V and a valve S1V, jointly controlling air pressure to the upper cylinder 167 of the device SP.

In series in the conduit 163 are the lower parts of the push button valves 165—165; a valve S2V; and the upper part of a valve X1V; all jointly controlling pressure to the upper cylinder 168 of a double cylinder and piston device YP.

In the line of conduit 164 are in series the aforesaid machine-cam-operated valve LS2V; a valve Y3V; and the lower part of the valve X1V; jointly controlling air pressure to the lower cylinder 169 of the device YP.

A branch conduit 170, from the conduit line 163, between the valves S2V and X1V; and a branch conduit 171 from the conduit line 164, between the valves Y3V and X1V; supply pressure to the upper and lower cylinders, 172 and 173 respectively of a double piston and cylinder device XP.

In the positions of the valves, before a press cycle is initiated by the operators, fluid under pressure in the conduit line 161 may flow through a duct 175 of the valve LS1V but is blocked off from the upper cylinder 167 of the device SP and the cylinder is exhausted through a duct 176 of the valve S1V.

Also, fluid under pressure in the conduit line 163 is blocked off from the upper cylinder 168 of device YP by the valve X1V and the cylinder 168 is exhausted through a duct 177 of the valve X1V.

Also, fluid pressure in the conduit line 164 is blocked off from the lower cylinder 169 of device YP by the valve X1V and the cylinder exhausts through a duct 178 of valve X1V.

Also, pressure in the upper cylinder 172 of device XP exhausts through branch conduit 170 and a duct 179 of valve S2V; and pressure in the lower cylinder 173 exhausts through branch conduit 171 and a duct 180 of valve Y3V.

Before the device LP (lower part of the diagram) was operated as described, thereby raising valve L2V, this valve, in the conduit line 162, blocked off pressure from the lower cylinder 166 of device SP and exhausted it through a duct 181 of valve L2V.

The device SP when operated by pressure in either cylinder 166 or 167, rocks upwardly an arm 190 and raises two valves S1V and S2V.

The device XP when operated by pressure in either cylinder 172 or 173 rocks upwardly an arm 191 and raises three valves X1V, X2V and X3V.

The device YP when operated by pressure in either cylinder 168 or 169 rocks upwardly an arm 192 and raises three valves Y4V, Y3V and Y2V, and also operates the main valve device YV by raising its valves 60A and 61A by the valve stem 64A as described for Fig. 10.

A pair of push button valves such as 165—165 (corresponding to the push button switches 55—55 of Fig. 10) is provided for each attendant at the press 1H; one pair only being shown for simplification; and all of them are located a safe distance from the machine 1H; and all of such pairs of valves 165 must be released by all of the operators and take up the positions illustrated, before a cycle of the machine 1H can be initiated.

Upon release of all of them, and valve L2V being now in the raised position illustrated as described above, pressure goes through their ducts 193—193, duct 194 of valve X3V, and duct 181 of raised valve L2V, to the lower cylinder 166 of device SP, raising its pistons and arm 190 and raising valves S1V and S2V.

In the conduit line 161, pressure may now go through duct 175 of cam valve LS1V and duct 176 of raised valve S1V to the upper cylinder 167 of device SP, holding it operated, independently of the push button valves 165—165; and putting subsequent control of the device SP on the cam valve LS1V.

The push button valves 165—165 may now be pushed down by the operators, and if, and only when, all of them are depressed and held down by all of the operators, pressure in conduit line 163 may go by way of valve ducts 195—195, duct 179 of valve S2V which is now in raised position, by conduit 170 to cylinder 172 of device XP, thereby operating the device and raising valves X1V, X2V and X3V.

Upon raising of valve X1V, pressure in conduit line 163 may now go through duct 177 of valve X1V to upper cylinder 168 of device YP and thereby raise the arm 192 and raise valves Y4V, Y3V and Y2V and operate main valve YV as described.

Both of the main valve devices ZV and YV are now in operated position and the press 1H starts a cycle as described for these valves hereinbefore.

When the press has done a part of its cycle, cam valve LS2V will go down and pressure in conduit line 164 will flow through its valve duct 196, valve duct 180 of valve Y3V (held up by device YP) and through duct 178 of valve X1V (held up by device XP) to lower cylinder 169 of device YP which holds device YP operated independently of the push button valves 165—165 and they can be released, and they then are restored upwardly.

Upper cylinder 168 of device YP now exhausts through duct 177 of valve X1V, duct 179 of valve S2V, and ducts 195—195 of valves 165—165, thus placing control of device YP on the cam valve LS2V and device cylinder 169.

Also, when cam valve LS2V goes down, device XP receives pressure in its lower cylinder 173 by way of conduit 164, duct 196, duct 180 and conduit 171; and cylinder 172 exhausts by conduit 170, ducts 179 and 195, thus placing control of device XP also on cam valve LS2V.

At a suitable point in the cycle of the press, cam valve LS1V is raised and again lowered as described.

The lower cylinder 166 of device SP had exhausted through duct 181 of valve L2V and duct 194 of valve X3V when device XP operated, and device SP was then held operated by pressure in cylinder 167 from conduit 161 through the duct 175 of valve LS1V, and duct 176 of valve S1V; so that when cam valve LS1V rises, cylinder 167 of device SP is exhausted through duct 176 and duct 175 and the device SP restores downwardly lowering valves S1V and S2V.

At this time therefore devices YP and XP are both held operated solely by pressure in conduit 164 through the duct 196 of lowered cam valve LS2V.

When the end of the machine cycle is reached, cam valve LS2V is again raised, to the illustrated position, and this cuts off pressure from the conduit 164; and exhausts the device YP through valve ducts 178, 180 and 196; and exhausts the device XP by conduit 171 through ducts 180 and 196, and devices XP and YP restore their arms 191 and 192 downwardly lowering valves X1V, X2V and X3V and valves Y4V, Y3V, Y2V and allowing main valve YV to be restored and cut off pressure from the press and stop it as described.

According to the principle of the invention, the valve device ZV is to remain operated and not restore upon restoring of the main valve device YV during normal operation, but must restore if valve device YV fails to restore, and provision for this is made as follows.

Valve device ZV is held operated by device ZP. Device ZP may be held operated by pressure in either cylinder 182 or 113, through duct 188 of valve X2V or duct 187 of valve Y2V and before operation of the system is normally held operated by the latter.

Device YP cannot operate and raise valve Y2V (which would restore device ZP), until after device XP operates and raises valve X1V, because device YP is, prior thereto, exhausted at the ducts 177—178 of valve X1V.

When valve X2V is raised by device XP, and holds device ZP operated through duct 188, then valve Y2V is raised, exhausting cylinder 183 leaving control of device ZP on valve X2V.

Conversely, when main valve YV is restored by restoring of device YP by exhaust at cam valve LS2V as described, valve Y2V lowers again and holds ZP operated through duct 187 and cylinder 183.

If however valve device YV or device YP or valve Y2V failed to restore, leaving the control of ZP on valve X2V at its duct 188 and cylinder 182, then restoring of device XP (which is also caused to restore by the exhaust at valve LS2V) will lower valve X2V and exhaust the cylinder 182 of ZP at duct 188, and cause ZP to restore and allow valve device ZV to be restored.

To insure that, in normal operation, the valve Y2V at the device ZP will move down and keep ZP operated, before the valve X2V moves down and exhausts it to restore it, the following provision may be made.

The duct 188 of valve X2V may be elongated upwardly and the duct 187 of valve Y2V may be elongated downwardly, as shown. Both valves are up at the time under consideration. Upon exhaust at cam valve LS2V, both valves, X2V and Y2V will start down due to simultaneous exhaust of XP and YP. The duct 187 of valve Y2V will due to its longitudinal downward, supply pressure from conduit 106 to cylinder 183, before duct 188, due to its elongation upwardly begins to exhaust cylinder 182 at duct 188.

While it is true that when the cam valve LS2V goes up and opens the exhaust at the duct 196, and as described, exhausts the device YP through valve Y3V, valve Y3V will be restored by YP, and tend to cut off the exhaust; and, also, XP exhausts by way of conduit 171 and restores, and restores its valve X1V and tends to cut off the exhaust.

By elongating the duct 180 of valve Y3V upwardly and the duct 178 of valve X1V upwardly, as shown, cut off of exhaust will be delayed until devices YP and XP have restored sufficiently to perform their functions as described.

Further, as to signals, upon the occurrence of abnormal operation, and failure of the main valve YV or of the device YP to restore and the consequent failure of restoring of the valves Y4V, Y3V, Y2V, then, at conduits 135—136, valve Y4V will remain up; and, upon subsequent restoring of devices XP and ZP, valve Z2V of device ZP will restore to the position illustrated and the cylinder 122 of device LP will exhaust through the ducts 139 and 140 in series, and the device LP will restore. This will restore valve L3V down and it will exhaust the pressure switch 154 and cut off the green light G; and will also restore valve Y4V down, and the pressure switch 151 will get pressure through the valve duct 150 and put on the red lamp R.

Also at the beginning of operations, if the main valve YV operated but the emergency valve ZV had for any reason not previously been operated, as described, the ducts 139 and 140 would again be in series and cause the red lamp R to be illuminated alone as described.

A simplification of the signalling system may, if desired, be effected as shown in Fig. 12, wherein, with reference to Fig. 11A, the conduits 141, 148; and the pressure switches 154, 151; and the valves L3V and L4V, are omitted; and contactors L3, L4 are provided operated directly by the arm 127, and contactor L4 closing the circuit to the red lamp R, across the mains 146, 147 and the contact L3 opening the circuit to the green lamp G, when the arm 127 moves downwardly upon restoring of device LP as described for Fig. 11A; and vice versa, energizing the green lamp G alone when the arm 127 is rocked upwardly, as described for Fig. 11A.

Fig. 11A–11B illustrates a fluid pressure embodiment of the invention wherein the fluid pressure is air pressure and it is believed that in view of the showing of Fig. 9 compared with that of Fig. 8, those skilled in the art will understand without further illustration or description how to produce an embodiment corresponding to Fig. 11A–11B but in which the fluid pressure is liquid pressure.

It will appear that the functional principle embodied in all of the forms above described, namely, that of holding inactive, a stand-by or emergency contactor Z (or valve ZV) during normal operation of a main contactor Y (or valve YV); and of bringing into action the contactor Z (or valve ZV) in the event of failure of contactor Y (or valve YV) to cut off the power to or actuation of the subject machine or apparatus, depends upon reliable nonfailing operation of contactor X in the forms of Figs. 1 to 10, and of device XP in the form of Fig. 11A–11B. This however is not merely transferring the possibility of function failure from one point of the system to another. It is well known by those skilled in the art that devices such as the contactor X and device XP would be small devices in the nature of relays, operated by and controlling energy of small amount, and that devices performing the function of relays can readily be made to function infallibly over very long periods of time; whereas for example the contacts Y1 of contactor device Y, or the valves of valve device YV and the contactor or valve device as a whole, must be of large size to be able to handle the greater energy going to the controlled machine or apparatus, and therefore they wear or get out of adjustment or arc at the contacts etc., and otherwise begin to deteriorate from the time they are installed and put into use. It is also well known that in electrical or fluid pressure systems of power control in general, when they deteriorate and fail to function, do so at the points where the greater energy is received or delivered and not at the relay or auxiliary parts where small energy is transmitted or controlled.

Thus the purposes of the invention are accomplished by insuring that interruption of the primary energy transmitted to the machine will infallibly occur at the time when the performance of that function is relied upon; even though the performance of that function depends upon the infallible functioning of auxiliary devices.

However the contactor X upon whose infallible relay functioning the embodiments of Figs. 1 to 10 rest, comprises make and break contacts, X1 to X3; and if even in a reliable relay device such as the contactor X there be any point at which it might be said to be more liable to fail to function normally than at another, it is at these contacts, as is well known; and therefore in some cases it may be preferred to eliminate even this remote possibility of function-failure of the embodiment by the elimination of these auxiliary contacts.

This may be done as shown in Fig. 13 wherein the contacts X1, X2, X3 are eliminated, and at the same time all of the other auxiliary or control contacts have also been eliminated, that is, the contacts S1, S2, of contactor S; the contacts Y2, Y3, Y4 of contactor Y; the contacts Z2 of contactor Z; and the contacts L1 to L4 of contactor L.

In Fig. 13, the source of current 4—4, for the main power circuit of the machine, to be made and broken on the contacts Y1 and Z1, may be either direct or alternating current; whereas the current for the control system mains 13 and 14 is alternating current supplied from mains 197 through a transformer 198.

As is well known, a winding subjected to alternating potential, and having an iron core, has high inductance, and high consequent impedance, and very small current will flow in the winding; but if the iron core be removed, the impedance falls to a negligible value, being then due to ohmic resistance alone, and large current flows.

The current may be reduced to a negligibly small value by moving an iron core into the winding; and increased to a large value by moving the core out of the winding; and in Fig. 13 as an example, this principle is utilized in the circuits of the control system in substitution for actually breaking and making the current at contacts.

Referring to contactor X for example in Fig. 13, the contactor is provided with iron cores 199, 200, 201, connected to the parts of the contactor that move upwardly when the winding 7 is energized (that is, in the diagrammatic showing of the contactor, are connected to a contactor main plunger 202 in the main winding 7).

Stationary coils, 203, 204, 205 are provided coaxially of the movable cores.

In the positions illustrated, the cores 199, 200 are within the coil 203, 204 and the core 201 is below and outside of the coil 205; and negligible current flows in the coils 203, 204, and large current flows in the coil 205.

When the main plunger 202 is moved upwardly by its winding 7, cores 199, 200 are thereby moved upwardly out of the coils 203, 204, causing large current to flow therein, and the core 201 is moved upwardly into the coil 205 reducing its current to a negligibly small value.

The combinations of cores and coils 199, 203; 200, 240; and 201, 205; are designated, respectively as X1, X2 and X3; and are so designated where they are reproduced elsewhere in the system.

The operation in Fig. 13 corresponds to Fig. 7 wherein closing control circuits are closed at contacts X1 and X2, and a control circuit is opened at X3.

In Fig. 13, the other contactors S, Y, Z and L are similarly provided with coil and core combinations, for like purposes as described for contactor X, and reproduced elsewhere in the system; and are identified by the same reference characters S1, S2, Y2, etc. as in Fig. 7, so that it will be apparent that the embodiment of Fig. 13 will operate in the same manner as that of Fig. 7 without further description.

All of the functioning of the control system of Fig. 13, therefore, except that effected manually, or by the controlled apparatus, is performed within always-closed circuits.

In the part-electric, part fluid embodiments of the invention, of which Figs. 8 and 9 are illustrative examples, the coil-and-core combinations described above may be associated with the valve devices, instead of with the electromagnetic contactors; this being indicated fragmentarily in Fig. 14, where the valve device YV of Fig. 8 or of Fig. 9 is reproduced.

The plunger 69A of the device YV is moved inwardly by energization of the winding 5 as in Figs. 8 and 9; and the plunger has a non-magnetic extension 206 upon which are mounted cores 207, 208, 209 movable therewith into and out of windings 210, 211, 212; the respective core-and-coil combinations being designated as Y3, Y2, Y4; and in view of the foregoing description performing the same function as the contacts Y3, Y2 and Y4 of Figs. 8 and 9.

We claim:

1. In a control system for controlling the transmission of power from a power source to an apparatus; a first and a second operable and restorable power transmitting device, connected between the source and the apparatus, and both of which when operated jointly transmit power to the apparatus; and either of which when restored interrupts transmission of power; actuable control means to operate both devices; to effect transmission; and to intermittently restore and again operate the first device to cause it to interrupt transmission and again effect transmission repeatedly; and control means responsive automatically to failure of the first device to restore; to restore the second device and maintain it restored to discontinue transmission.

2. In a control system for controlling the transmission of power from a power source to an apparatus; a first and a second operable and restorable power transmitting device, connected between the source and the apparatus, and both of which when operated jointly transmit power to the apparatus; and either of which when restored interrupts transmission of power; actuable control means to operate both devices; to effect transmission; and to intermittently restore and again operate the first device to cause it to interrupt transmission and again effect transmission repeatedly; and control means responsive automatically to the failure of the first device to restore; to intermittently restore and again operate the second device, to cause it to interrupt transmission and again effect transmission repeatedly.

3. In a control system for controlling the transmission of power from a power source to an apparatus; a first and a second operable and restorable power transmitting device, connected between the source and the apparatus, and both of which when operated jointly transmit power to the apparatus; and either of which when restored interrupts transmission of power; actuable control means to operate both devices; to effect transmission; and to intermittently restore and again operate the first device to cause it to interrupt transmission and again effect transmission, repeatedly; and control means responsive automatically to failure of the first device to repeatedly interrupt and effect transmission; to cause the second device to do so.

4. In a cyclically operating machine of the type comprising an apparatus operable by power to start the machine and initiate a cycle, and restorable by interruption of the power to stop the machine at the end of the cycle; a first and a second operable device both of which devices when operated concurrently, jointly transmit power from a source of power to the apparatus to operate it, and either of which when restored interrupts the power thereto; first control means actuable to operate both devices concurrently; second control means actuable by the machine at the end of the cycle to restore the first device to interrupt power to the apparatus to cause it to restore and stop the machine; and third control means responsive, automatically, to failure of the first device to restore, to restore the second device.

5. Control means for controlling operation of a machine having apparatus effective, when operated to start the machine, and effective when restored, to stop the machine; the control means comprising a pair of operable and restorable devices both of which, when operated concurrently, effect operation of the said apparatus to start the machine, and either of which, when restored, effects restoring of the said apparatus to stop the machine; and comprising means for operating both devices concurrently; and comprising means actuable by running of the machine, to restore one of said devices; and comprising means operating automatically upon failure of said one device to restore, to restore the other of said devices.

6. The control means described in claim 1 and in which the devices are electric contactors having their contacts in series in a circuit between a source of current and the apparatus; and in which the circuit is closed and opened by operating and restoring the contactors respectively.

7. The control means described in claim 1 and in which the devices comprise respectively valves in series in a conduit line between a source of fluid pressure and the apparatus, and in which the conduit line is opened and closed by operating and restoring the valves respectively.

8. Control means for controlling the operation of a cyclically operating machine of the type provided with a clutch and a brake, and an apparatus operable by fluid pressure to release the brake and set the clutch to start a machine cycle, and restorable by spring means to release the clutch and set the brake to stop the machine at the end of the cycle; the control means comprising a first and second operable and restorable valve device, each comprising valve means opened by operation of the device and both valve means disposed in a conduit line between a source of fluid pressure and the apparatus; a control system comprising means actuable to operate both valve devices to cause their valve means to open the conduit line and thereby jointly supply fluid pressure to the apparatus to operate it; and comprising means actuable by the machine to restore one valve device to cause its valve means to perform the function of closing the conduit line and cutting off source pressure from the apparatus and exhausting the apparatus to cause the apparatus to be spring-restored; and comprising means to automatically restore the other valve device to cause its valve means to perform said function, upon failure of the said one device to do so.

9. Control means for controlling the operation of a power driven machine of the type provided with a clutch and a brake, and an apparatus operable by fluid pressure from a source of pressure, to release the brake and set the clutch to start the machine, and having means to restore the apparatus to release the clutch and set the brake upon exhaust of the pressure, to stop the machine; the control means comprising two operable and restorable valve devices; both disposed in a conduit line between a source of fluid pressure and the apparatus; and each comprising valve means which, when both devices are operated, open the conduit line and thereby jointly supply fluid pressure to the apparatus to operate it; and when either device is restored, closes the conduit line and opens an exhaust from the apparatus, to cause the apparatus to restore; the control means comprising means actuable to operate both valve devices and comprising means actuable by the machine to restore one valve device to cause its valve means to close the conduit line and open the exhaust, and comprising means to automatically restore the other device to cause it to close the conduit line and open the exhaust, upon failure of the said one device to do so.

10. Control means for controlling the operation of a power driven machine of the type provided with a clutch and a brake, and an apparatus operable by fluid pressure from a source of pressure, to release the brake and set the clutch to start the machine, and having means to restore the apparatus to release the clutch and set the brake upon exhaust of the pressure to stop the machine; the control means comprising two operable and restorable valve devices; both disposed in a conduit line between a source of fluid pressure and the apparatus; and each comprising valve means which, when both devices are operated, open the conduit line and thereby jointly supply fluid pressure to the apparatus to operate it; and when either device is restored, closes the conduit line and opens an exhaust from the apparatus, to cause the apparatus to restore; the control means comprising manually actuable means to operate one valve device and maintain it operated and to repeatedly operate and restore the other valve device to cause it to repeatedly, open the conduit line and close the exhaust and close the conduit line and open the exhaust; and comprising means actuable by the machine to restore said other valve device to cause it to close the conduit line and open the exhaust; and comprising means to restore the said one device to cause it to close the conduit line and open the exhaust upon any failure of said other valve device to do so.

References Cited in the file of this patent

UNITED STATES PATENTS

| | | |
|---|---|---|
| 1,036,975 | Dexter et al. | Aug. 27, 1912 |
| 1,634,382 | Oberschmidt | July 5, 1927 |
| 1,650,286 | Livingston | Nov. 22, 1927 |
| 1,865,814 | Berry | July 5, 1932 |
| 2,132,811 | Tompkins et al. | Oct. 11, 1938 |
| 2,193,880 | Peet | Mar. 19, 1940 |
| 2,198,767 | Glasner | Apr. 30, 1940 |
| 2,254,029 | Chladek et al. | Aug. 26, 1941 |
| 2,306,949 | Ipsen | Dec. 29, 1942 |
| 2,354,854 | Doll | Aug. 1, 1944 |
| 2,365,557 | Keith | Dec. 19, 1944 |
| 2,398,648 | Kennedy | Apr. 16, 1946 |
| 2,409,908 | Simpkins | Oct. 22, 1946 |
| 2,636,581 | Bitler | Apr. 28, 1953 |